United States Patent
Routh et al.

(10) Patent No.: US 12,503,872 B2
(45) Date of Patent: Dec. 23, 2025

(54) LOCKING MECHANISMS FOR ADJUSTABLE TELESCOPIC PROP ASSEMBLIES

(71) Applicant: PERI SE, Weissenhorn (DE)

(72) Inventors: Anibrata Routh, Mumbai (IN); K. S. Arun, Mumbai (IN); CNVS Rao, Mumbai (IN); Vinothkumar Raju, Mumbai (IN); Ankush Rathod, Mumbai (IN)

(73) Assignee: PERI SE, Weissenhorn (DE)

( * ) Notice: Subject to any disclaimer, the term of this patent is extended or adjusted under 35 U.S.C. 154(b) by 241 days.

(21) Appl. No.: 18/259,491

(22) PCT Filed: Dec. 28, 2021

(86) PCT No.: PCT/IB2021/062380
§ 371 (c)(1),
(2) Date: Jun. 27, 2023

(87) PCT Pub. No.: WO2022/144767
PCT Pub. Date: Jul. 7, 2022

(65) Prior Publication Data
US 2024/0052656 A1    Feb. 15, 2024

(30) Foreign Application Priority Data

Dec. 28, 2020  (IN) .............................. 202011056727
Dec. 28, 2020  (IN) .............................. 202011056728

(51) Int. Cl.
*E04G 25/06*    (2006.01)
*E04G 25/04*    (2006.01)

(52) U.S. Cl.
CPC ......... *E04G 25/063* (2013.01); *E04G 25/061* (2013.01); *E04G 25/065* (2013.01); *E04G 2025/042* (2013.01)

(58) Field of Classification Search
CPC ... E04G 25/063; E04G 25/061; E04G 25/065; E04G 11/48; E04G 2025/042
(Continued)

(56) References Cited

U.S. PATENT DOCUMENTS 2,589,482 A * 3/1952 Downey ................. F16B 21/12
                                                     403/379.2
4,443,144 A * 4/1984 Defrancq ................ F16B 21/12
                                                     403/379.2
(Continued)

FOREIGN PATENT DOCUMENTS

CA      2739414 A1 * 11/2012 ......... E04G 21/3242
CH       372829 A  * 10/1963 ........... E04G 25/063
(Continued)

*Primary Examiner* — Taylor Morris
(74) *Attorney, Agent, or Firm* — SLEMAN & LUND LLP

(57) ABSTRACT

A locking mechanism for locking an inner tube with an outer tube of an adjustable telescopic push-pull prop assembly is disclosed. The locking mechanism includes a slotted prop nut having a slot and adapted to move in either direction when rotated on the outer tube having threads, a guiding ring adapted to be accommodated in the slot of the slotted prop nut, and a captive grooved pin assembly adapted to be accommodated in the guiding ring for locking and unlocking the inner tube and the outer tube such that the slotted prop nut encases the guiding ring and the captive grooved pin assembly. The positioning of the captive grooved pin assembly is such that it does not hinder the rotation of the slotted prop nut.

10 Claims, 22 Drawing Sheets

(58) Field of Classification Search
USPC .................................. 248/354.3, 644, 354.5
See application file for complete search history.

(56) References Cited

U.S. PATENT DOCUMENTS

| | | | | |
|---|---|---|---|---|
| 4,527,363 | A * | 7/1985 | Saether | E04G 21/26 |
| | | | | 182/180.1 |
| 4,840,528 | A * | 6/1989 | Doom | F16B 21/12 |
| | | | | 411/351 |
| 5,004,390 | A * | 4/1991 | Cumbie | F16B 21/12 |
| | | | | 411/351 |
| 5,060,903 | A * | 10/1991 | Schworer | E04G 25/068 |
| | | | | 403/109.5 |
| 5,061,133 | A * | 10/1991 | May | F16B 21/12 |
| | | | | 411/351 |
| 5,590,863 | A * | 1/1997 | Sasaki | E04G 17/14 |
| | | | | 248/354.3 |
| 6,568,894 | B2 * | 5/2003 | Golden | F16B 21/12 |
| | | | | 411/513 |
| 7,165,361 | B2 * | 1/2007 | Vanagan | E04G 11/48 |
| | | | | 248/354.3 |
| 7,584,932 | B2 * | 9/2009 | Shih | E04G 17/14 |
| | | | | 248/688 |
| 7,837,413 | B1 * | 11/2010 | Kundel, Sr. | E02D 17/08 |
| | | | | 248/644 |
| 9,926,711 | B2 * | 3/2018 | Haeberle | E04G 25/063 |
| 10,132,427 | B1 | 11/2018 | Park | |
| 10,495,133 | B2 * | 12/2019 | Kleine | F16B 35/06 |
| 10,914,088 | B2 * | 2/2021 | Hochgatterer | E04G 25/061 |
| 2018/0031018 | A1 | 2/2018 | Muirhead | |
| 2022/0275660 | A1 * | 9/2022 | Owens | E04G 25/063 |

FOREIGN PATENT DOCUMENTS

| | | | | |
|---|---|---|---|---|
| CH | 679506 | A5 * | 2/1992 | E04G 25/063 |
| DE | 102011122065 | | 6/2013 | |
| EP | 0318089 | A1 * | 5/1989 | E04G 25/063 |
| FR | 2628466 | A1 * | 6/1992 | E04G 25/065 |
| FR | 2670232 | A1 * | 6/1992 | E04G 25/06 |
| FR | 2900178 | A1 * | 10/2007 | E04G 25/06 |
| GB | 746083 | A * | 3/1956 | E04G 25/063 |
| GB | 884445 | A * | 12/1961 | E04G 25/065 |
| GB | 2482581 | B * | 8/2012 | E04G 25/06 |
| JP | H07139192 | | 5/1995 | |
| JP | H1122210 | A * | 1/1999 | E04G 25/063 |
| JP | 2006063653 | | 3/2006 | |
| KR | 200421012 | Y1 * | 7/2006 | E04G 7/20 |
| KR | 20140090409 | A * | 7/2014 | E04G 25/065 |
| KR | 200479487 | Y1 * | 2/2016 | E04G 11/48 |
| KR | 101885992 | | 8/2018 | |
| KR | 20200037946 | A * | 4/2020 | E04G 25/065 |
| WO | WO-2017213296 | A1 * | 12/2017 | E04G 11/48 |

\* cited by examiner

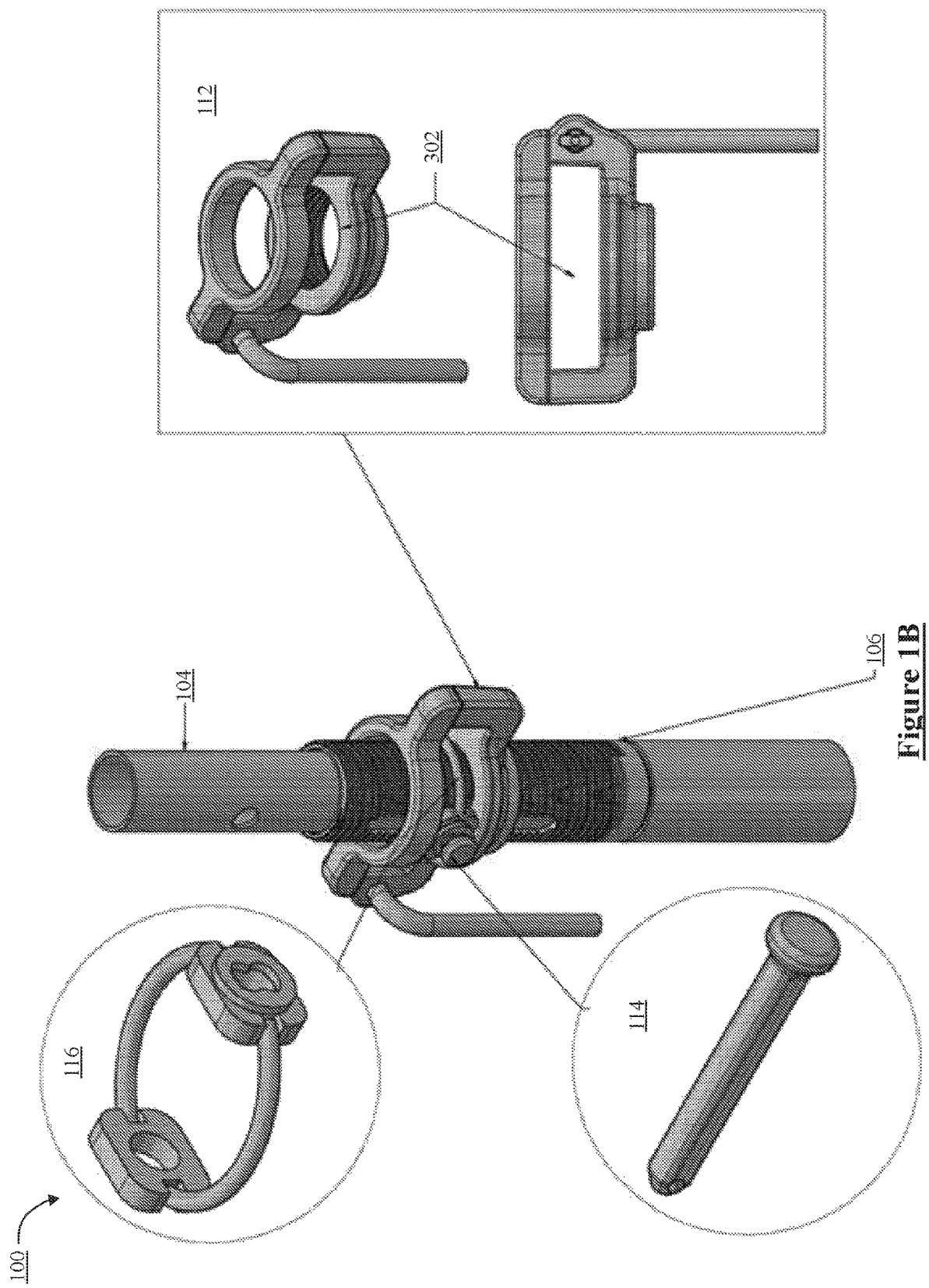

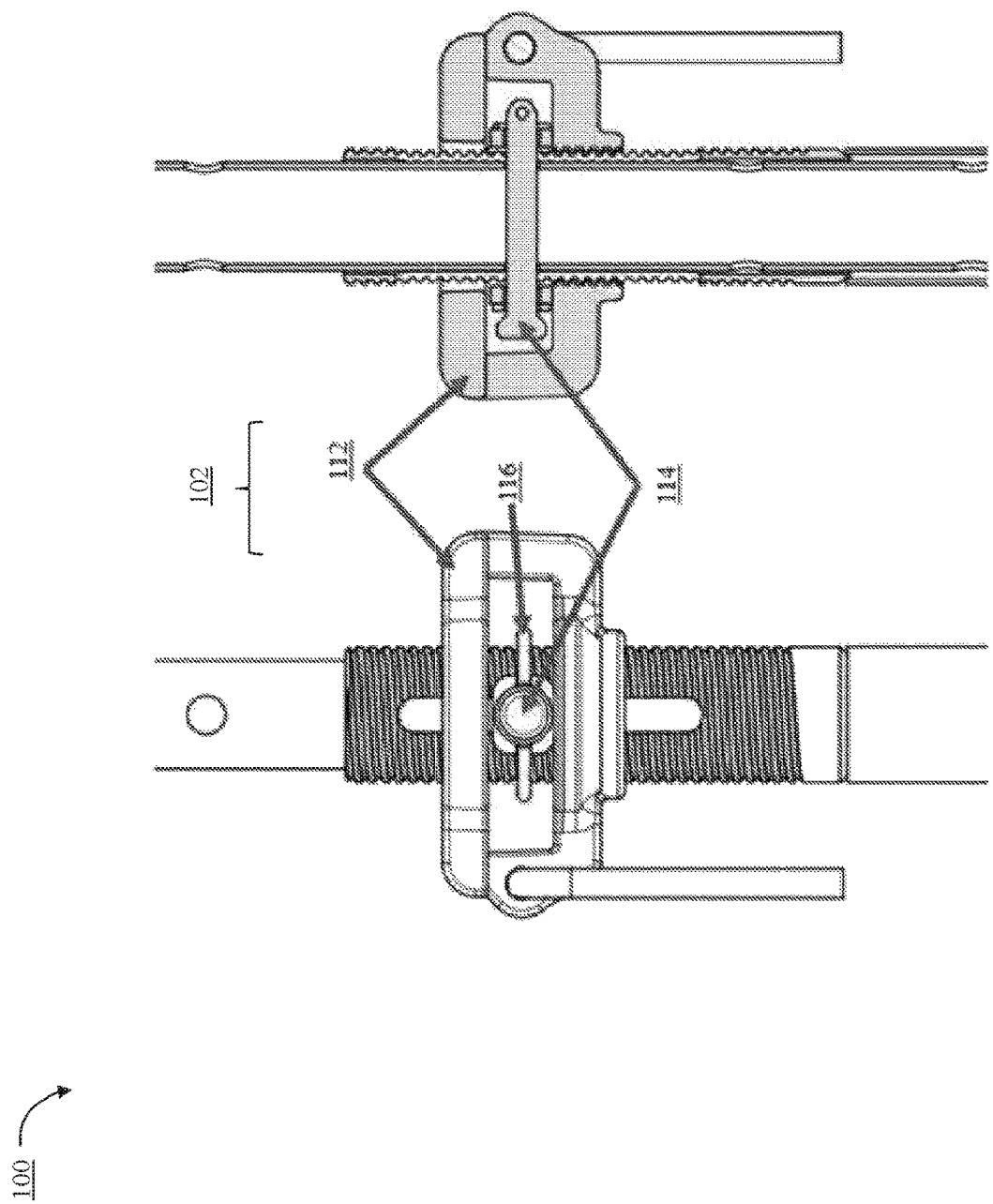

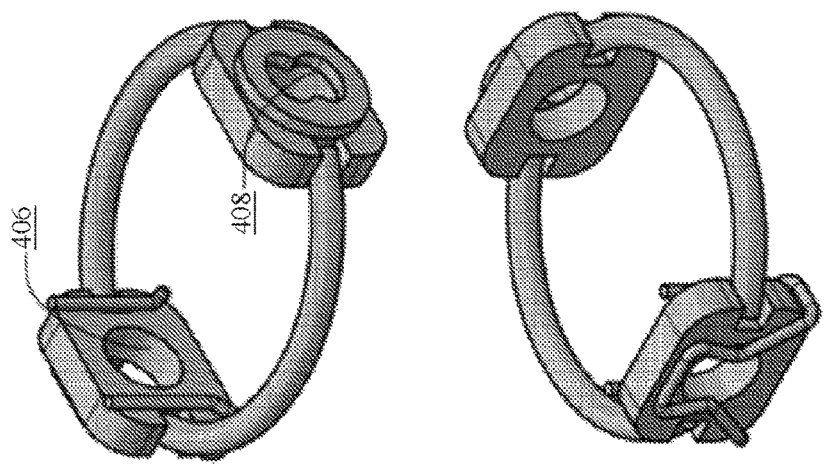
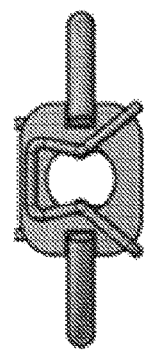
Figure 6A
Figure 6B
Figure 6C

1000

LOCKING MECHANISMS FOR ADJUSTABLE TELESCOPIC PROP ASSEMBLIES

CROSS REFERENCE TO RELATED APPLICATIONS

The present application claims the priority of Indian patent application nos. 202011056727 and 2020011056728 filed on Dec. 28, 2020, which are incorporated herein by reference in its entirety.

FIELD OF THE INVENTION

The present disclosure relates to construction industry and more particularly, relates to locking mechanisms for any adjustable formwork components, such as for an adjustable telescopic push-pull prop assembly and an adjustable telescopic floor prop assembly.

BACKGROUND

In the construction industry, wall forms or panels are generally used as supporting components to form structures, for example, to form pillars, walls, and roofs. In case of construction of larger structures, multiple such panels are connected to each other to form a formwork structure. The formwork structure so formed is required to be supported, for example, to be in a predefined position during the construction of the structure for alignment and stability against tilting using push-pull props or floor props.

Such push-pull props usually include an inner tube and an outer tube assembled to facilitate a two-way telescopic functionality to the push-pull prop, i.e., the length of the push-pull prop can be adjusted to support panels of varying dimensional characteristics. Floor props also usually include an inner tube and an outer tube assembled to facilitate a telescopic functionality to the prop.

To lock the inner tube with the outer tube in position, several locking structures are used. The inner tube and the outer tube should be suitably locked to avoid any undesirable movement of the props while supporting the framework. Any error in the assembly and positioning of the props may lead to falling of the panels causing damage at the construction site. Therefore, it is critical to ensure accurate positioning of the props to support the formwork.

In the normal adjustable telescopic props and push-pull props, the telescopic pipe is moved up and down by the connection of the prop nut to a separate hooking mechanism which is locked to the prop pin. Generally, in these types of props, the pin is made captive by use of a wire rope for tying the pin or making the anti-loss arrangement by using large geometry of the pin, for example, a G-shaped hook. These G-hooks have problems of stacking, or the loops can get caught in other parts.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a locking mechanism for locking an inner tube with an outer tube of an adjustable telescopic push-pull prop assembly is disclosed. The locking mechanism includes a slotted prop nut having a slot and adapted to move in either direction when rotated on the outer tube having threads, a guiding ring adapted to be accommodated in the slot of the slotted prop nut, and a captive grooved pin assembly adapted to be accommodated in the guiding ring for locking and unlocking the inner tube and the outer tube, such that the slotted prop nut encases the guiding ring and the captive grooved pin assembly. Further, the positioning of the captive grooved pin assembly is such that it does not hinder the rotation of the slotted prop nut.

In another embodiment of the present disclosure, an adjustable telescopic push-pull prop assembly is disclosed. The prop assembly includes an inner tube, an outer tube placed concentrically with respect to the inner tube such that the inner tube is adapted to be extended out of the outer tube for adjusting the length of the prop assembly based on dimensions of a formwork structure to be supported, and a locking mechanism for locking the inner tube with the outer tube. The locking mechanism includes a slotted prop nut having a slot and adapted to move in either direction when rotated on the outer tube having threads, a guiding ring adapted to be accommodated in the slot of the slotted prop nut, and a captive grooved pin assembly adapted to be accommodated in the guiding ring for locking and unlocking the inner tube and the outer tube such that the slotted prop nut encases the guiding ring and the captive grooved pin assembly. Further, the positioning of the captive grooved pin assembly is such that it does not hinder the rotation of the slotted prop nut.

In an embodiment, the slotted prop nut includes a top portion having a first opening, and a bottom portion having a second opening adapted to be aligned with the first opening of the top portion. The second opening includes a plurality of threads. Each of the first opening and the second opening may be understood as circular openings. The slotted prop nut also includes a pair of arms formed to connect the top portion to the bottom portion forming the slot to accommodate the guiding ring, thereby making it a slotted prop nut.

In an embodiment of the present disclosure, a locking mechanism for locking and unlocking an inner tube and an outer tube of an adjustable telescopic floor prop assembly is disclosed. The locking mechanism includes a guiding ring adapted to be disposed on a prop nut, and a captive grooved pin assembly adapted to be accommodated in the guiding ring for locking and unlocking the inner tube and the outer tube.

In another embodiment of the present disclosure, an adjustable telescopic floor prop assembly is disclosed. The prop assembly includes an inner tube, an outer tube placed concentrically with respect to the inner tube such that the inner tube is adapted to be extended out of the outer tube for adjusting the length of the prop assembly based on dimensions of a formwork structure to be supported, and a locking mechanism for locking the inner tube with the outer tube. The locking mechanism includes a guiding ring adapted to be disposed on a prop nut, and a captive grooved pin assembly adapted to be accommodated in the guiding ring for locking and unlocking the inner tube and the outer tube.

In an embodiment, the captive grooved pin assembly includes a shaft portion having a pair of oppositely positioned grooves formed along the length such that a profile of a first end of the shaft portion is different from a profile of a second end of the shaft portion. The captive grooved pin assembly further includes a head portion adapted to be used as a handle to pull out the shaft portion.

In an embodiment, the guiding ring includes a first slot having a profile corresponding to the profile of the second end of the shaft portion of the captive grooved pin assembly. The guiding ring includes a second slot formed at a diametrically opposite point with respect to the first slot and having a profile corresponding to the profile of the first end of the shaft portion of the captive grooved pin assembly.

Therefore, the invention can be said to constitute two aspects linked with the single inventive concept. First, the slotted nut for push-pull action is disclosed, wherein use of separate connecting mechanism for push-pull action is avoided by giving a slot in the prop nut to encase the locking pin. Second, the guiding ring and a grooved pin to make the pin captive is disclosed, wherein it is a compact arrangement with a short straight pin which avoids the traditional anti-loss arrangements like G-hook which uses a large geometry and also helps in convenient stacking due to its short size.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1B illustrates an isometric view of the adjustable telescopic push-pull prop assembly depicting various components of the locking mechanism in a blown-up view, according to an embodiment of the present disclosure;

FIG. 2A illustrates a front schematic view of a portion of the adjustable telescopic push-pull prop assembly depicting the locking mechanism, according to an embodiment of the present disclosure;

FIG. 2B illustrates a cross-sectional view of a portion of the adjustable telescopic push-pull prop assembly depicting the locking mechanism, according to an embodiment of the present disclosure;

FIG. 6A, FIG. 6B, and FIG. 6C illustrate a perspective view, a front view, and a back view of the guiding ring, respectively, according to an embodiment of the present disclosure;

Figure 1A:
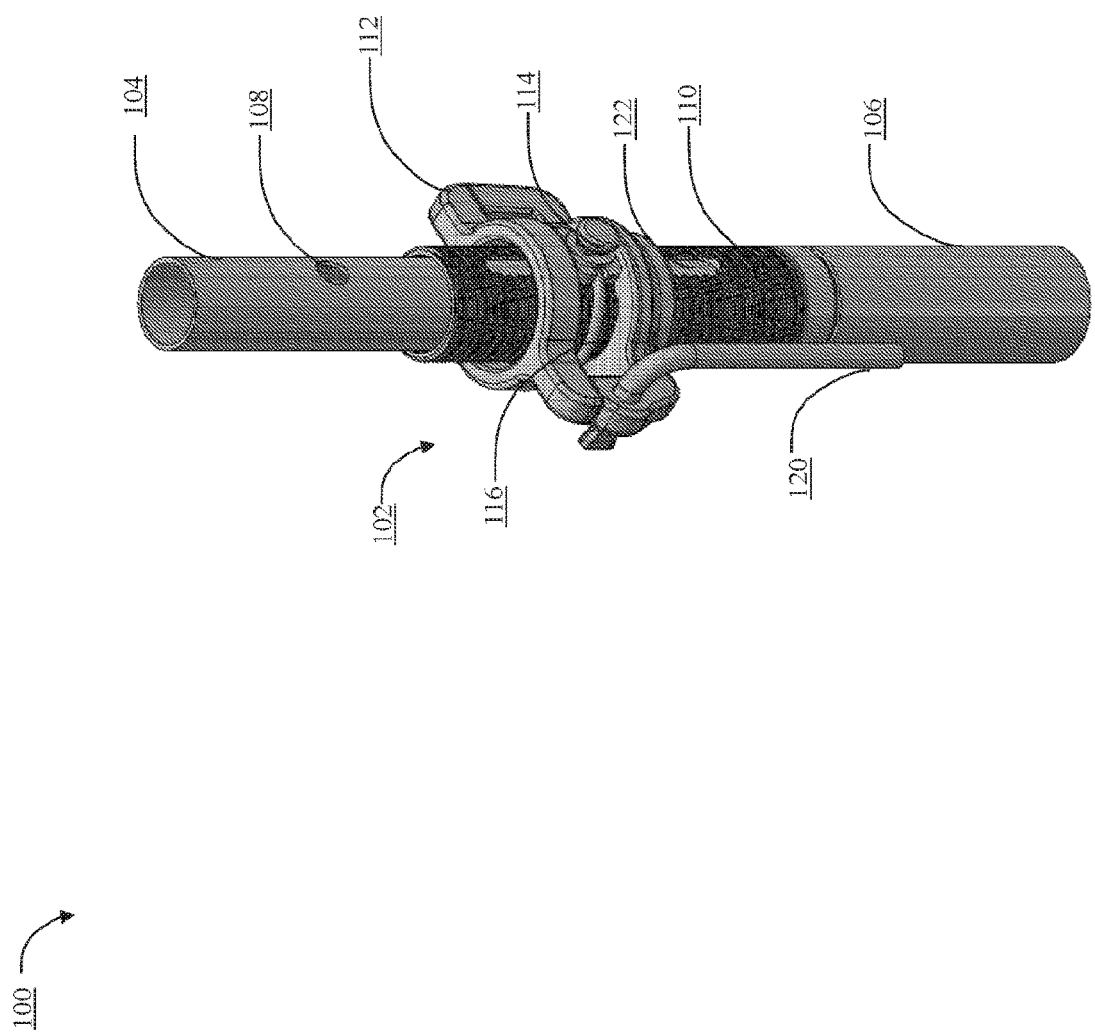
FIG. 1A illustrates an isometric view of an adjustable telescopic push-pull prop assembly having a locking mechanism, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict, or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

FIG. 1A illustrates an isometric view of an adjustable telescopic prop assembly with push pull mechanism 100 having a locking mechanism 102, according to an embodiment of the present disclosure. FIG. 1B illustrates an isometric view of the adjustable telescopic push-pull prop assembly 100 depicting various components of the locking mechanism 102 in a blown-up view, according to an embodiment of the present disclosure. For the sake of readability, the adjustable telescopic prop assembly with push-pull action 100 may hereinafter be referred to as the prop assembly 100. In an embodiment, the prop assembly 100 may be formed of steel. In other embodiments, the prop assembly 100 may be formed of any other material than steel, without departing from the scope of the present disclosure.

The prop assembly 100 may include, but is not limited to, an inner tube 104 and an outer tube 106. As the name suggests, the inner tube 104 and the outer tube 106 are placed concentrically with respect to each other. The inner tube 104 may be received in a telescopic manner in the outer tube 106. Therefore, the inner tube 104 is adapted to be extended out of the outer tube 106 for adjusting the length of the prop assembly 100, based on dimensions of a formwork structure to be supported.

Particularly, based on the dimensions of the formwork structure, the inner tube 104 may be pulled out of or pushed in the outer tube 106. For example, for increasing the length of the prop assembly 100, the inner tube 104 may be pulled out of the outer tube 106. On the other hand, to reduce the length of the prop assembly 100, the inner tube 104 may be pushed in the outer tube 106. Once the position of the inner tube 104 is adjusted with respect to the outer tube 106, the locking mechanism 102 may be adapted to lock the inner tube 104 with the outer tube 106.

In an embodiment, for effecting the locking of the inner tube 104 and the outer tube 106, the inner tube 104 may include a plurality of through holes 108. The through holes 108 may individually referred to as the through hole 108 or a through hole 108-1, a through hole 108-2, and a through hole 108-N. In the illustrated embodiment, a through hole is depicted as 108. Further, on an end of the outer tube 106, a plurality of screw threads 110 are provided on an external surface. The screw threads 110 may be adapted to engage the locking mechanism 102 for locking and unlocking the inner tube 104 with the outer tube 106.

In an embodiment, the locking mechanism 102 may be adapted to lock the inner tube 104 with the outer tube 106 to be in the predefined position. The locking mechanism 102 may be a slotted prop nut assembly having a captive pin. FIG. 2A illustrates a front schematic view of a portion of the prop assembly 100 depicting the locking mechanism 102, according to an embodiment of the present disclosure. FIG. 2B illustrates a cross-sectional view of a portion of the prop assembly 100 depicting the locking mechanism 102, according to an embodiment of the present disclosure. Referring to FIG. 1, FIG. 2A, and FIG. 2B, the locking mechanism 102 may include, but is not limited to, a slotted prop nut 112, a guiding ring 116 adapted to be accommodated in the slotted prop nut 112, and a captive grooved pin assembly 114 adapted to be accommodated in the guiding ring 116 for locking and unlocking the inner tube 104 and the outer tube 106. The captive grooved pin assembly 114 may be accommodated such that the slotted prop nut 112 encases the guiding ring 116 and the captive grooved pin assembly 114. Further, the positioning of the captive grooved pin assembly 114 is such that it does not hinder the rotation of the slotted prop nut 112.

In an embodiment, the prop assembly 100 may also include a handle 120 to rotate the slotted prop nut 112 to facilitate the push-pull action. In an embodiment, the slotted prop nut 102 may be adapted to move in either direction, when rotated on the outer tube 106 having threads. When the inner tube 104 is locked with the outer tube 106, the locking mechanism 102 may be adapted to align them as well as support the formwork properly. Therefore, the locking mechanism 102 may be adapted to align the inner tube 104 with the outer tube 106 before locking.

In operation, based on the dimensional characteristics of the formwork to be supported, the inner tube 104 and the outer tube 106 are positioned with respect to each other such that a slot 122 of the outer tube 106 is aligned with at least one of the through holes 108. Accordingly, the handle 120 may be operated to move the slotted prop nut 112 over the aligned slots 108, 122. Further, the captive grooved pin assembly 114 may be inserted through the guiding ring 116 and the aligned slots 108, 122 to lock the inner tube 104 with the outer tube 106.

Figure 2C:
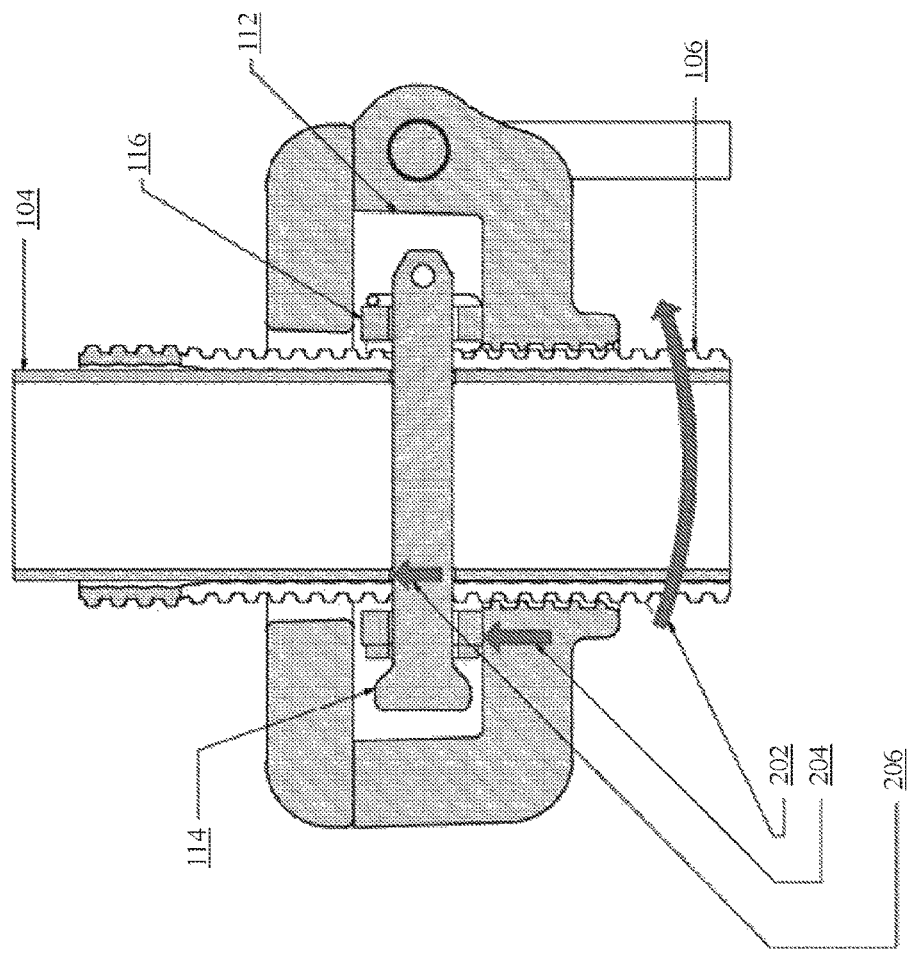
FIG. 2C illustrates a push action of the adjustable telescopic prop assembly, according to an embodiment of the present disclosure.
Figure 2C:
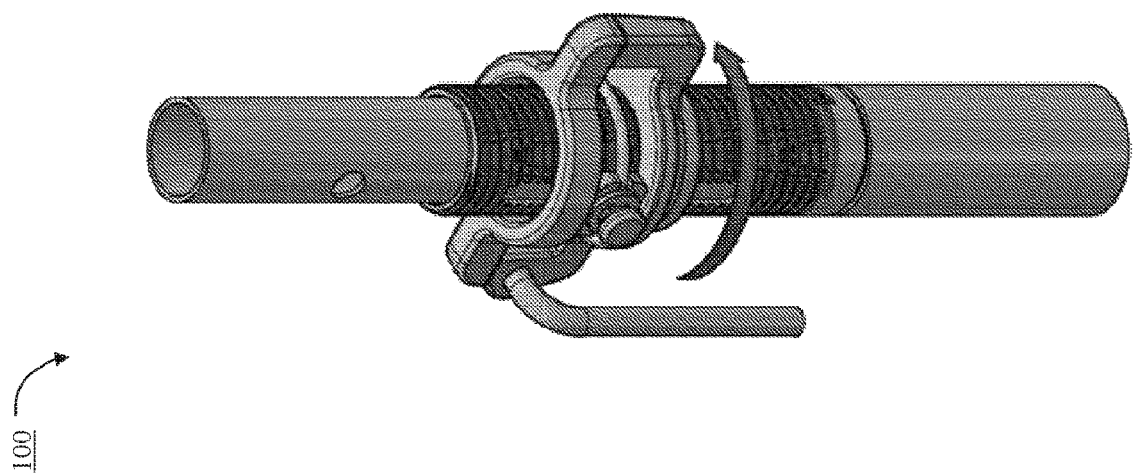

Particularly, FIG. 2C illustrates a push action of the prop assembly 100, according to an embodiment of the present disclosure. As illustrated through 202, when rotated in an anti-clockwise direction, the slotted prop nut 112 moves upward along the threaded outer tube 106. Accordingly, as shown through 204, the captive grooved pin assembly 114 and the guiding ring 116 positioned in a slotted portion of the prop nut 112 are pushed upwards along with the prop nut 112. As a result, as illustrated through 206, the inner tube 104 will move upward as the captive grooved pin assembly 114 is engaged in the slot 108 of the inner tube 104.

Figure 2D:
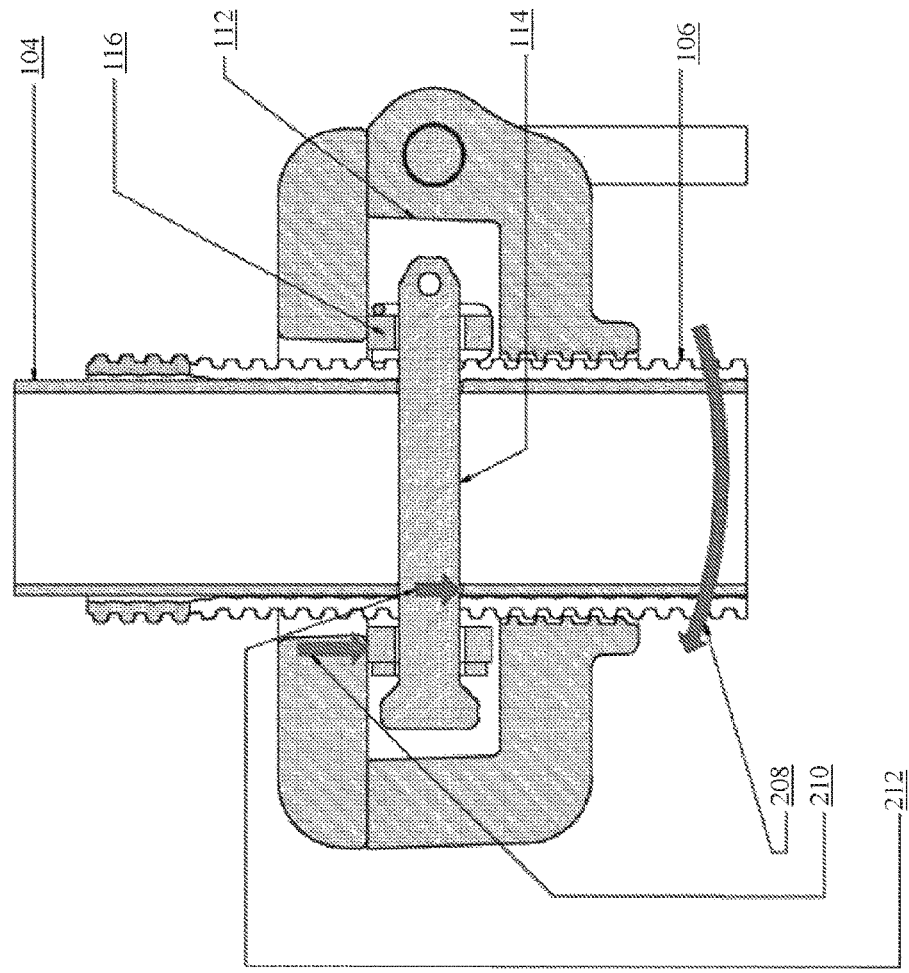
FIG. 2D illustrates a pull action of the adjustable telescopic prop assembly, according to an embodiment of the present disclosure.
Figure 2D:
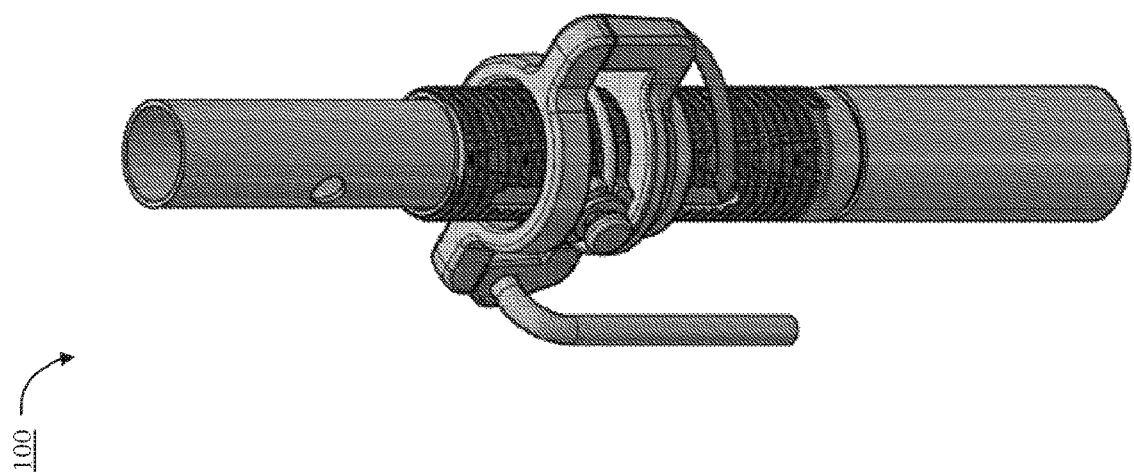

Further, FIG. 2D illustrates a pull action of the prop assembly 100, according to an embodiment of the present disclosure. As illustrated through 208, when rotated in a clockwise direction, the slotted prop nut 112 moves downward along the threaded outer tube 106. Accordingly, as shown through 210, the captive grooved pin assembly 114 and the guiding ring 116 positioned in a slotted portion of the prop nut 112 are pushed downwards along with the prop nut 112. As a result, as illustrated through 212, the inner tube 104 will move downward as the captive grooved pin assembly 114 is engaged in the slot 108 of the inner tube 104.

Figure 3A:
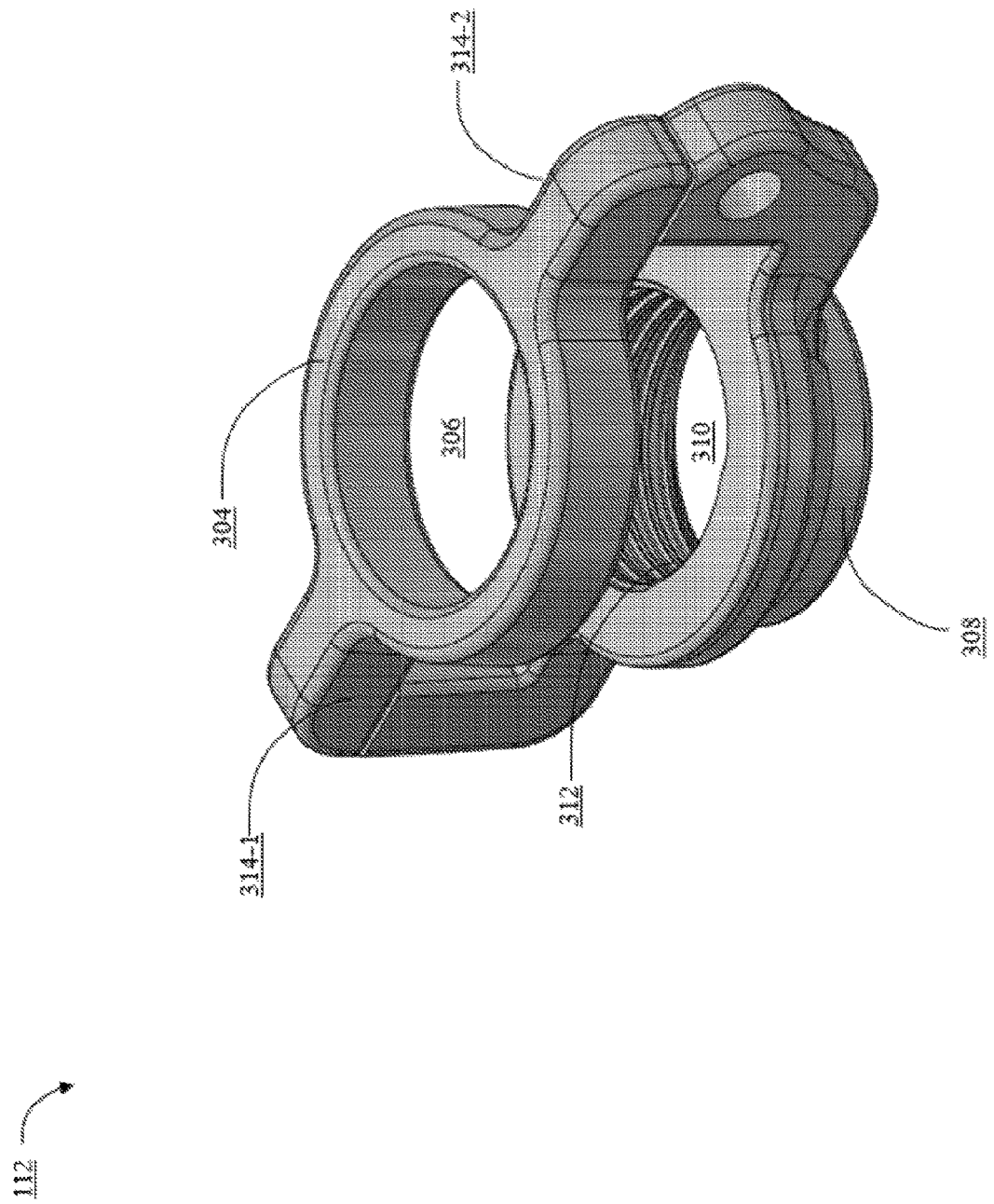
FIG. 3A illustrates an isometric view of a slotted prop nut, according to an embodiment of the present disclosure.
Figure 3C:
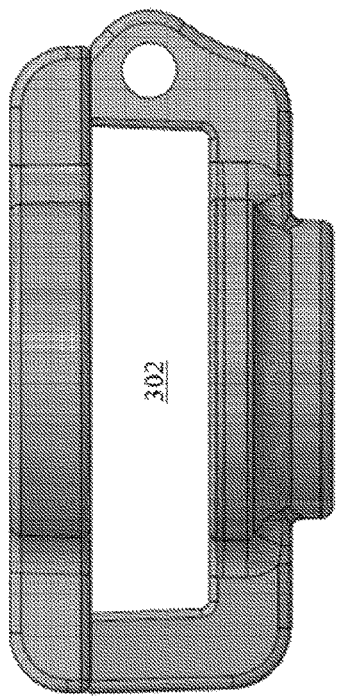
FIG. 3B, FIG. 3C, FIG. 3D, and FIG. 3E illustrate a bottom view, a front view, a top view, and a side view of the slotted prop nut, according to an embodiment of the present disclosure.
Figure 3E:
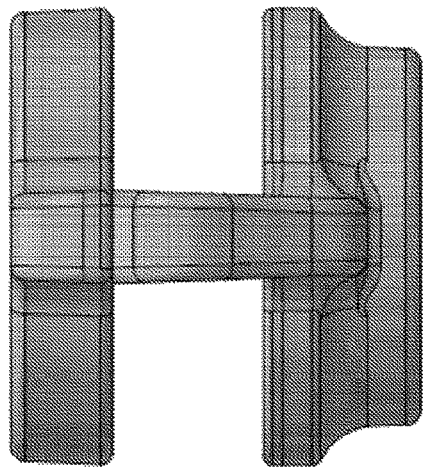
Figure 3B:
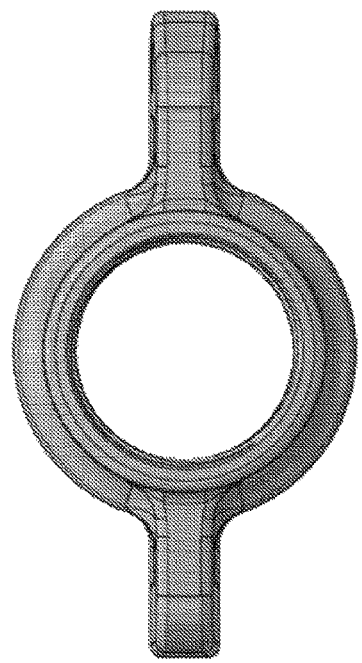
Figure 3D:
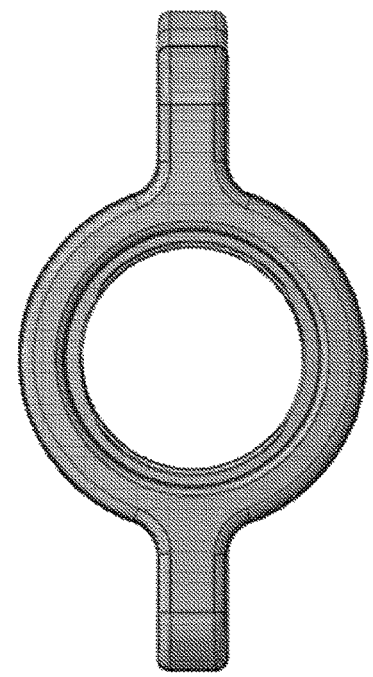

In an embodiment, the slotted prop nut 112 may include a slot for receiving the guiding ring 116. FIG. 3A illustrates an isometric view of the slotted prop nut 112 having the slot 302 for receiving the guiding ring 116 and housing the captive grooved pin assembly 114, according to an embodiment of the present disclosure. FIG. 3B, FIG. 3C, FIG. 3D, and FIG. 3E illustrate a bottom view, a front view, a top view, and a side view of the slotted prop nut 112 having the slot 302, according to an embodiment of the present disclosure.

Referring to FIG. 3A, FIG. 3B, FIG. 3C, FIG. 3D, and FIG. 3E, the slotted prop nut 112 may include, but is not limited to, a top portion 304 having a first opening 306, and a bottom portion 308 having a second opening 310. In an embodiment, each of the first opening 306 and the second opening 310 may be understood as circular openings. The slotted prop nut 112 is formed such that the second opening 310 may be adapted to be aligned with the first opening 306. In an embodiment, the second opening 310 may also include a plurality of threads 312, for example, to engage with the screw threads 110 during assembly. Further, the slotted prop nut 112 may also include a pair of arms 314 formed to connect the top portion 304 to the bottom portion 308 forming the slot 302 to accommodate the guiding ring 116. The pair of arms 314 may individually be referred to as the arm 314-1 and the arm 314-2.

Figure 4A:
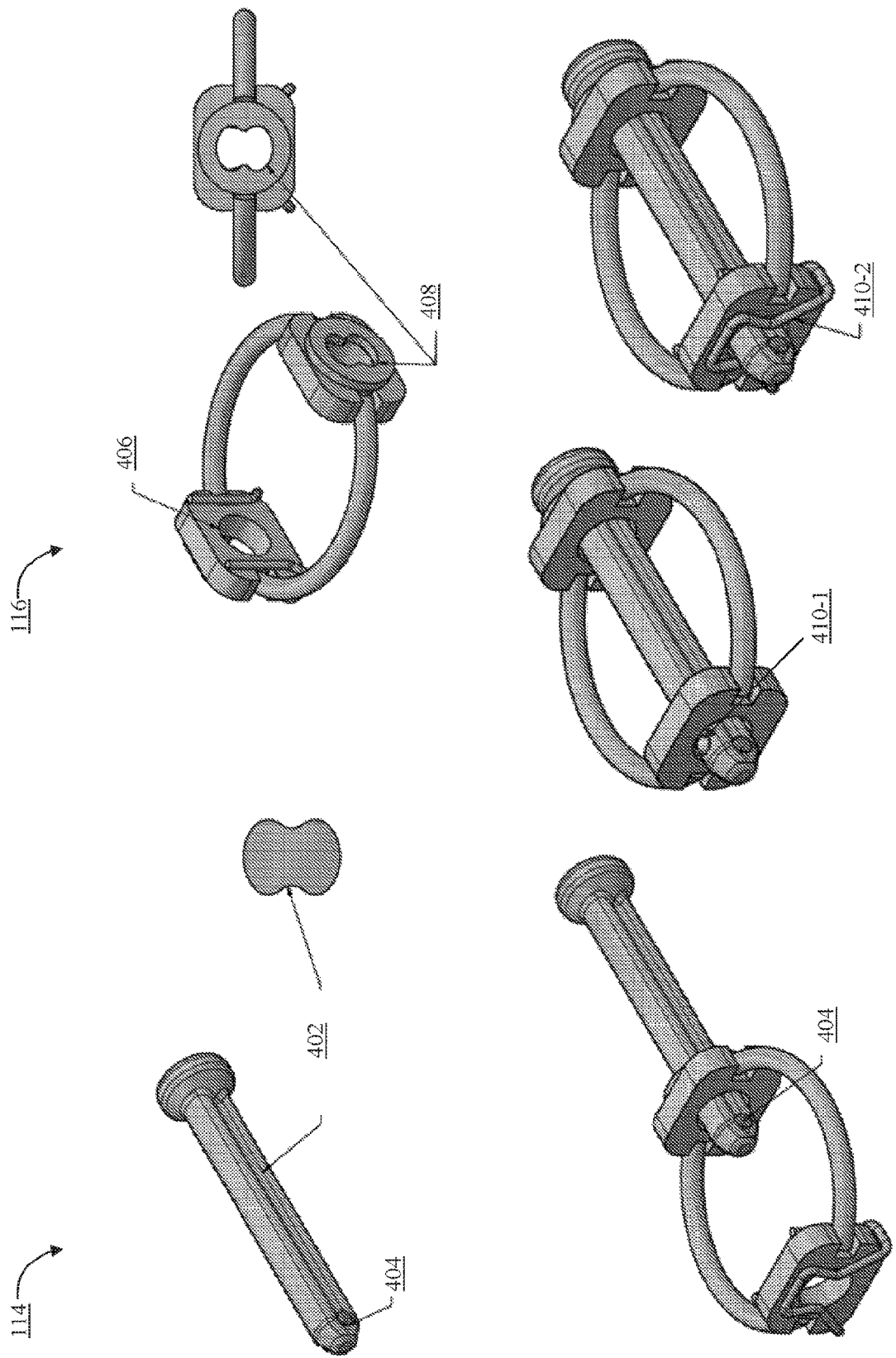
FIG. 4A illustrates an assembly of a guiding ring and a captive grooved pin assembly of the locking mechanism, according to an embodiment of the present disclosure.

FIG. 4A illustrates an assembly of the guiding ring 116 and the captive grooved pin assembly 114, according to an embodiment of the present disclosure. As illustrated, the captive grooved pin assembly 114 has a pair of oppositely positioned grooves 402 formed along the length.

The captive grooved pin assembly 114 also includes at least one of a rivet, a spot weld, and a dowel pin 404 formed on the shaft portion 506 and adapted to restrict removal of the captive grooved pin assembly 114 from the guiding ring 116, thus making the grooved pin 114 captive within the guiding ring 116 in a locked state. For the sake of readability, at least one of the rivet, the spot weld, and the dowel pin 404 is hereinafter referred to as the dowel pin 404.

Further, the guiding ring 116 may include a first slot 406 having a circular profile corresponding to the maximum diameter of the captive grooved pin assembly 114. The guiding ring 116 may also include a second slot 408 formed at a diametrically opposite point with respect to the first slot 406. In an embodiment, the second slot 408 may have a profile corresponding to the pair of grooves 402 of the captive grooved pin assembly 114 that locks the captive pin with the guiding ring 116.

Once the captive grooved pin assembly 114 is inserted through the first slot 406 and the second slot 408 of the guiding ring 116, the dowel pin 404 restricts the movement of the captive grooved pin assembly 114 out of the second slot 408.

In an embodiment, the locking mechanism 100 may include a spring-loaded mechanism 410 adapted to prevent accidental dislodging of the captive grooved pin assembly 114 out of the first slot 406. In an embodiment, the spring-loaded mechanism 410 may include a spring ball stopper 410-1 formed on the shaft portion 506 of the captive grooved pin assembly 114. In an embodiment, the spring ball stopper 410-1 may be formed about an axis orthogonal to an axis of the dowel pin 404. In another embodiment, the spring-loaded mechanism 410 may include an omega clip 410-2 disposed on the guiding ring 116. The omega clip 410-2 may be formed adjacent to the first slot 406 of the guiding ring 116 and adapted to prevent accidental dislodging of the captive grooved pin assembly 114 out of the first slot 406 and in turn of the guiding ring 116. Further constructional and operational features of the captive grooved pin assembly 114 and the guiding ring 116 are explained in detail in the subsequent description.

Figure 4B:
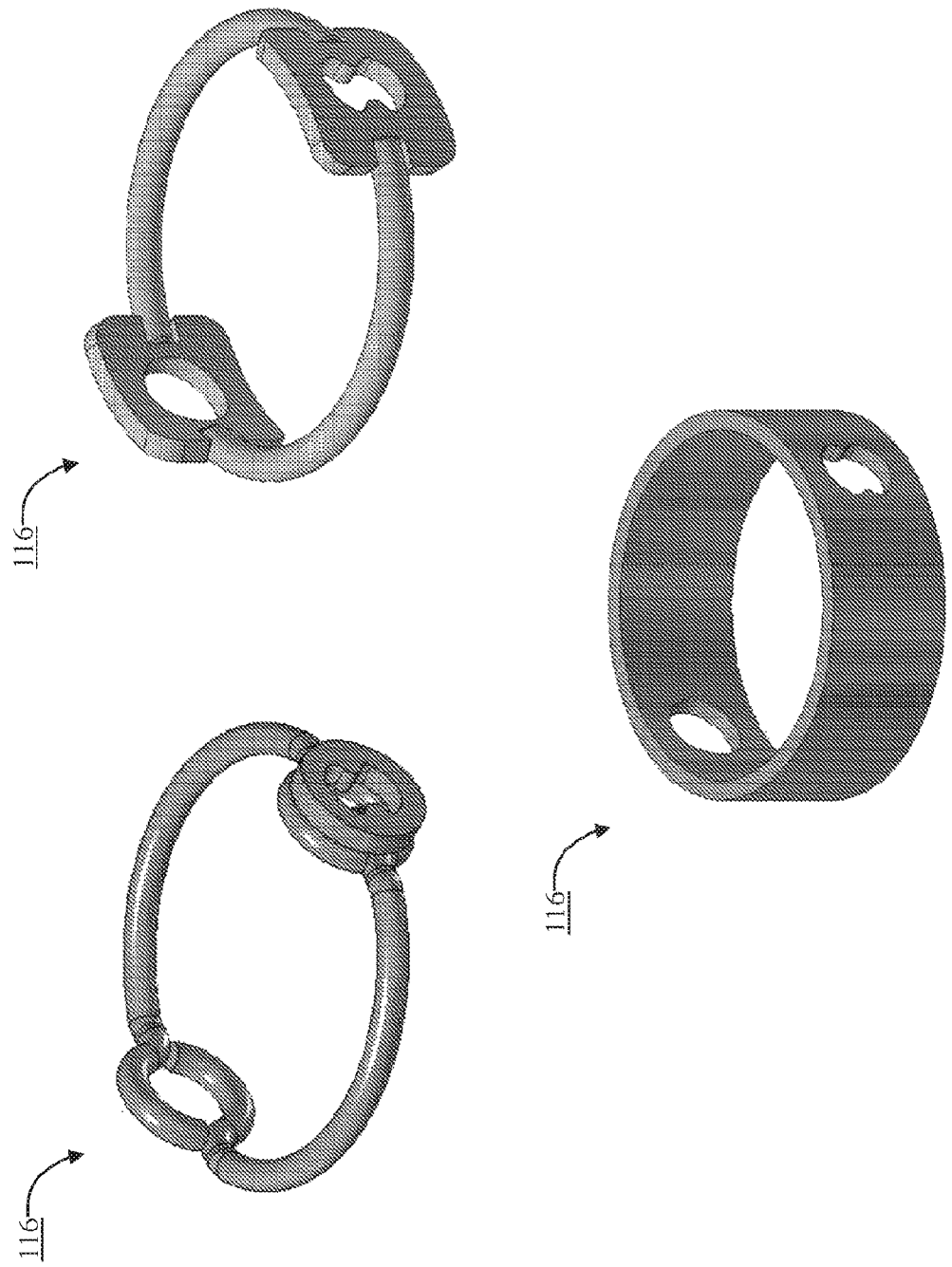
FIG. 4B illustrates an isometric view of alternate possible options for the guiding ring, according to an embodiment of the present disclosure.

FIG. 4B illustrates the other possible geometries and shapes of the guiding ring 116 which can be made out of rods or pipes bent to shape and welded to plates at diametrically opposite ends to house the captive pin. The groove in the pin assembly 114 and cut-out hole in the guiding ring 116 complement the shape of each other which will also obstruct the end of the groove and ensures that the pin remains captive. As would be appreciated by a person skilled in the art, in case of the guiding ring 116 of the present embodiment, the construction of the slotted prop nut 112 may vary to form the slot 302 corresponding to the guiding ring 116.

Figure 5A:
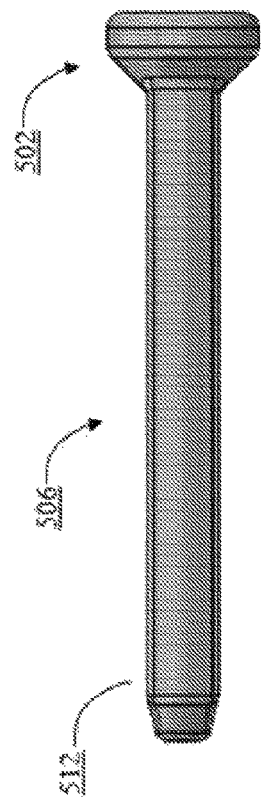
FIG. 5A, FIG. 5B, and FIG. 5C illustrate a top view, a side view, and a perspective view of the captive grooved pin assembly, respectively, according to an embodiment of the present disclosure.
Figure 5B:
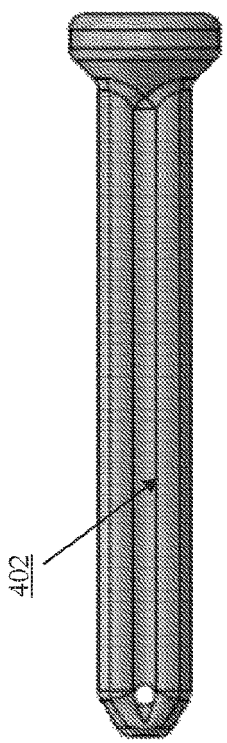
Figure 5C:
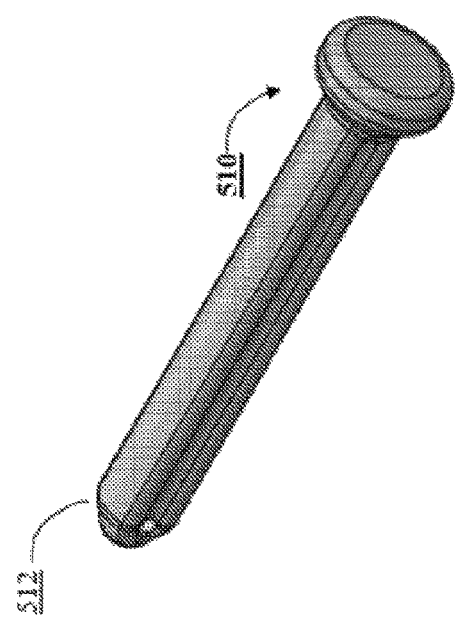
Figure 5D:
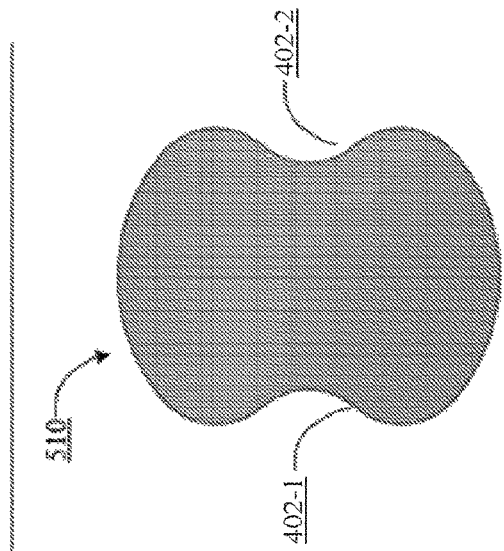
FIG. 5D illustrates a front view of the shaft portion depicting the profile of a first end of a shaft portion of the captive grooved pin assembly, according to an embodiment of the present disclosure.

FIG. 5A, FIG. 5B, and FIG. 5C illustrate a top view, a side view, and a perspective view of the captive grooved pin assembly 114, respectively, according to an embodiment of the present disclosure. The captive grooved pin assembly 114 may include a head portion 502 and a shaft portion 506. The head portion 502 may be adapted to be used to pull out the shaft portion 506. The shaft portion 506 has the pair of oppositely positioned grooves 402 formed along the length. The oppositely positioned grooves 402 may individually be referred to as 402-1 and 402-2. The grooves 402 may be formed such that a profile of a first end 510 of the shaft portion 506 is different from a profile of a second end 512 of the shaft portion 506. In an embodiment, the grooves 402 may be formed by a pre-manufacturing process or a post-manufacturing process. Figure SD illustrates a front view of the shaft portion 506 depicting the profile of the first end 510, according to an embodiment of the present disclosure.

As would be appreciated by a person skilled in the art, in other embodiments, the profile of the second end 512 of may vary depending on the constructional and operational requirements of the prop assembly 100 as far as it restricts the shaft portion 506 to completely move out of the guiding ring 116, without departing from the scope of the present disclosure. Accordingly, the positioning and construction of the grooves 402 may also change.

FIG. 6A, FIG. 6B, and FIG. 6C illustrate a perspective view, a front view, and a back view of the guiding ring 116, respectively, according to an embodiment of the present disclosure. The guiding ring 116 may include the first slot 406 having a profile corresponding to the profile of the second end 512 of the shaft portion 506 of the captive grooved pin assembly 114. In the illustrated embodiment, the first slot 406 may have a circular profile corresponding to the maximum diameter of the captive grooved pin assembly 114, thereby ensuring free through movement of the second end 512. The guiding ring 116 may also include the second slot 408 formed at a diametrically opposite point with respect to the first slot 406. The second slot 408 may have a profile corresponding to the profile of the first end 510 of the shaft portion 506 of the captive grooved pin assembly 114. In an embodiment, the second slot 408 may have a profile corresponding to the pair of grooves of the shaft portion 506 of the captive grooved pin assembly 114 that locks the captive pin with the guiding ring 116.

Referring to FIGS. 1 to 6, the assembly of the guiding ring 116 and the captive grooved pin assembly 114 may be locked due to the presence of the spring ball stopper 402 or an omega clip at the first end 510. In operation, this assembly would be made over the aligned inner tube 104 and the outer tube 106, particularly, when the slots 108 and 122 are aligned with each other. Therefore, the shaft portion 506 of the captive assembly 114 is inserted through the aligned slots 108, 122 to lock the inner tube 104 with the outer tube 106.

Further, the shaft portion 506 of the captive grooved pin assembly 114 is inserted diametrically through the guiding ring 116 such that the shaft portion 506 passes through the first slot 406 and then the second slot 408. Further, the shaft portion 506 does not completely come out of the guiding ring 116. This is due to the different shapes of slots provided at the diametrically opposite ends of the guiding ring 116 and the presence of the dowel pin 404 and the spring-loaded mechanism 410.

In an embodiment, the dowel pin 404 may be formed adjacent to the second end 512 on an external surface of the shaft portion 506. In an embodiment, the dowel pin 404 may be formed on any end of the shaft portion 506, which has a circular profile. The dowel pin 404 may be adapted to restrict removal of the shaft portion 506 through the second slot 408 of the guiding ring 116, thereby making the grooved pin 114 captive.

Figure 7B:
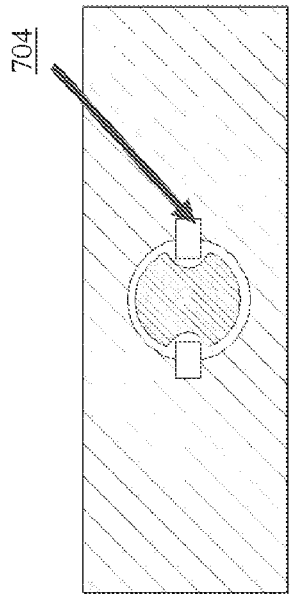
FIG. 7B illustrates a schematic view depicting a rod or a plate welded in the second slot, according to an embodiment of the present disclosure.
Figure 7A:
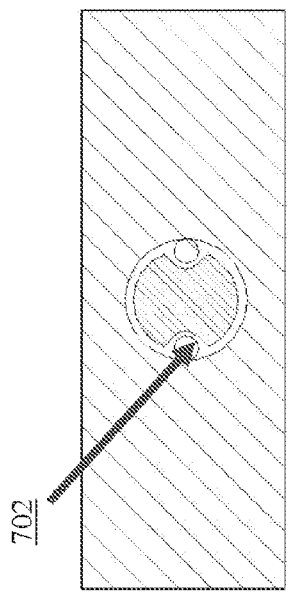
FIG. 7A illustrates a schematic view depicting a spot weld in a second slot of the guiding ring, according to an embodiment of the present disclosure.

FIG. 7A illustrates a schematic view depicting a spot weld 702 in the second slot 408 of the guiding ring 116, according to an embodiment of the present disclosure. Similarly, FIG. 7B illustrates a schematic view depicting a rod or a plate 704 welded in the second slot 408, according to an embodiment of the present disclosure. It is not limited to the above details as different combinations of shapes can be used which will stop the movement of the pin at the point where the groove ends complementing the shapes of the grooves provided in the pins.

Figure 8C:
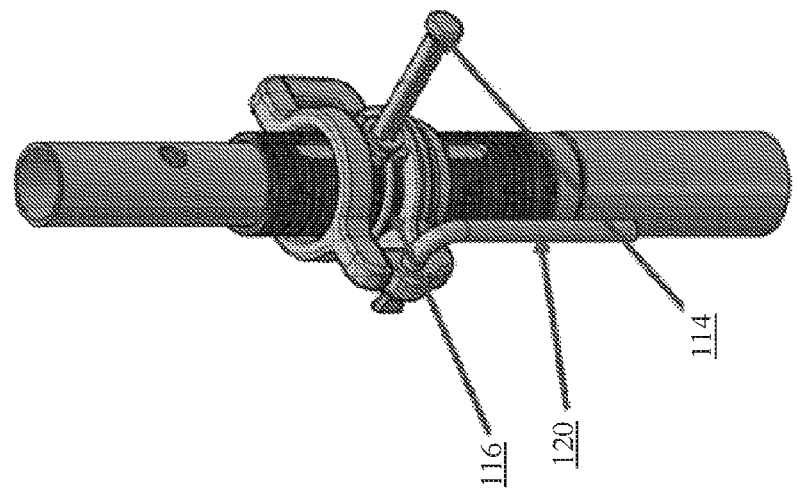
FIG. 8C illustrates an isometric view of the adjustable telescopic push-pull prop assembly depicting the unlocked position of the locking mechanism, according to an embodiment of the present disclosure.
Figure 8B:
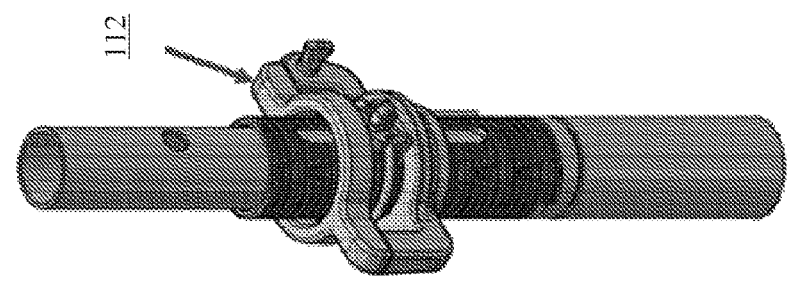
FIG. 8A and FIG. 8B illustrate a first isometric view and a second isometric view of the adjustable telescopic push-pull prop assembly depicting the locked position of the locking mechanism, respectively, according to an embodiment of the present disclosure.
Figure 8A:
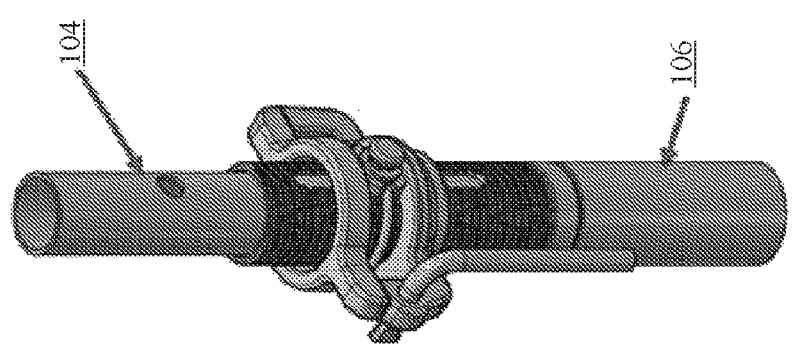
Figure 9D:
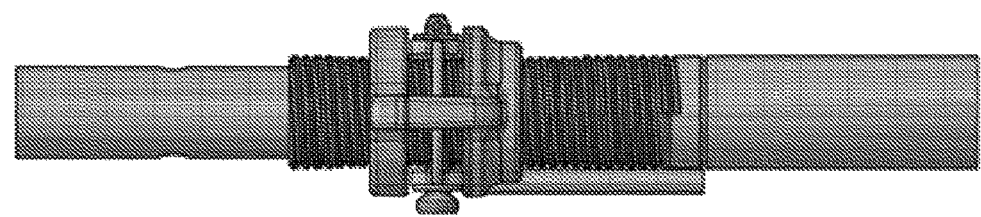
FIG. 9A, FIG. 9B, FIG. 9C, FIG. 9D, FIG. 9E, and FIG. 9F illustrate a front view, a back view, a left view, a right view, a top view, and a bottom view, respectively, of the adjustable telescopic push-pull prop assembly, according to an embodiment of the present disclosure.
Figure 9C:
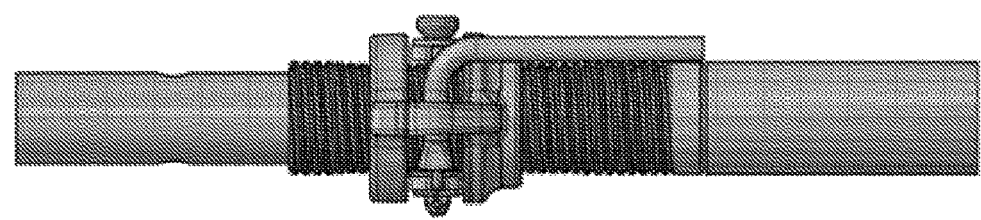
Figure 9B:
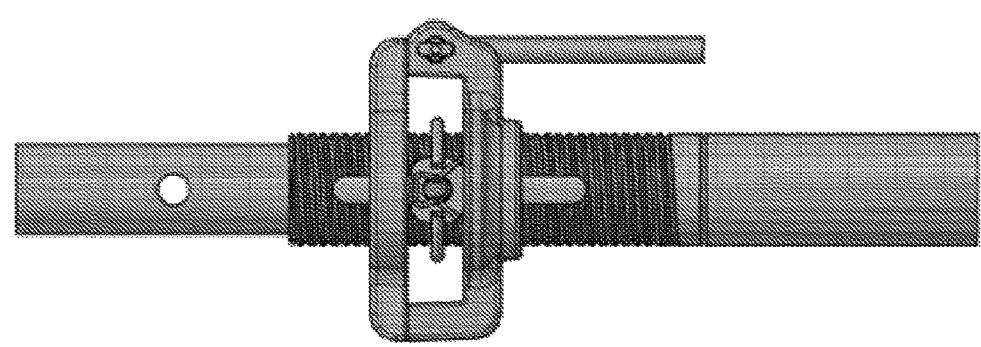
Figure 9A:
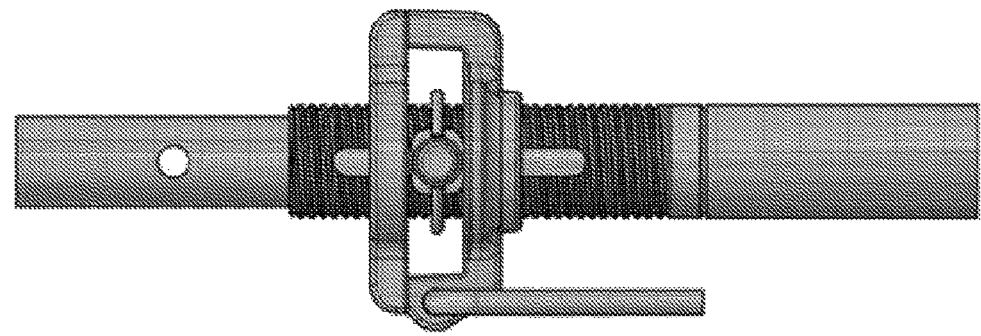
Figure 9F:
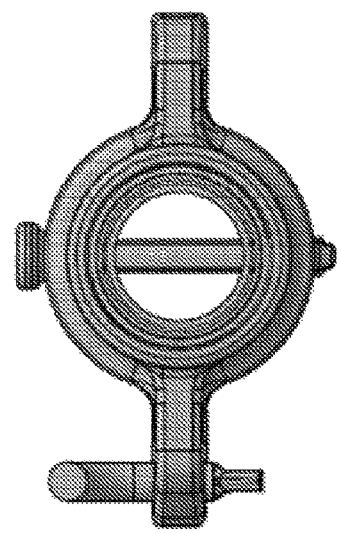
Figure 9E:
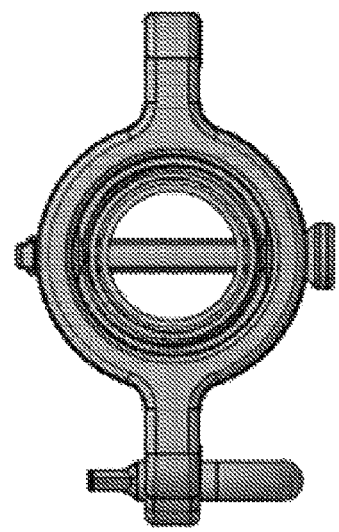

FIG. 8A and FIG. 8B illustrate a first isometric view and a second isometric view of the prop assembly 100 depicting the locked position of the locking mechanism 102, according to an embodiment of the present disclosure. The locked position is indicative of an operational state of the locking mechanism 102 when the captive grooved pin assembly 114 is inserted through the slots 108, 122 and the first slot 406 and the second slot 408 of the guiding ring 116 for locking the inner tube 104 and the outer tube 106 in the predefined position. FIG. 8C illustrates an isometric view of the prop assembly 100 depicting an unlocked position of the locking mechanism 102, according to an embodiment of the present disclosure. The removed position is indicative of an operational state of the locking mechanism 102 when the captive grooved pin assembly 114 is pulled out of the slots 108, 122 and the first slot of the guiding ring 116 for unlocking the inner tube 104 and the outer tube 106.

FIG. 9A, FIG. 9B, FIG. 9C, FIG. 9D, FIG. 9E, and FIG. 9F illustrate a front view, a back view, a left view, a right view, a top view, and a bottom view of the prop assembly 100 when the locking mechanism 102 is in the locked position, respectively, according to an embodiment of the present disclosure.

In another embodiment of the present disclosure, a locking mechanism for an adjustable telescopic floor prop assembly is disclosed. The adjustable telescopic floor prop assembly may also include a prop nut, but it would not be slotted like the slotted prop nut 112. Further, the adjustable telescopic floor prop assembly is adapted to exhibit a push action. The locking mechanism for this embodiment may include, but is not limited to, the captive grooved pin assembly and the guiding ring. The constructional and operational features of the captive grooved pin assembly and the guiding ring of the locking mechanism of the present embodiment would remain the same as that of the captive grooved pin assembly 114 and the guiding ring 116. Therefore, for the sake of brevity, the captive grooved pin assembly and the guiding ring are referred to as the captive grooved pin assembly 114 and the guiding ring 116, respectively. This is applicable for the constituent components of the captive grooved pin assembly 114 and the guiding ring 116, such as the shaft portion 506, the grooves 402, the first end 510, the second end 512, the head portion 502, the first slot 406, the second slot 408, the dowel pin 404, and the spring-loaded mechanism 410.

Similarly, the inner tube and the outer tube of the adjustable telescopic floor prop assembly would also be referred to as the inner tube 104 and the outer tube 106, as their construction and the operation remain the same. This is also applicable for the constituent parts of the inner tube and the outer tube. Therefore, the description of these components as explained with respect to the prop assembly 100 and the locking mechanism 102 remain equally applicable for the floor prop assembly of the present embodiment.

Figure 10:
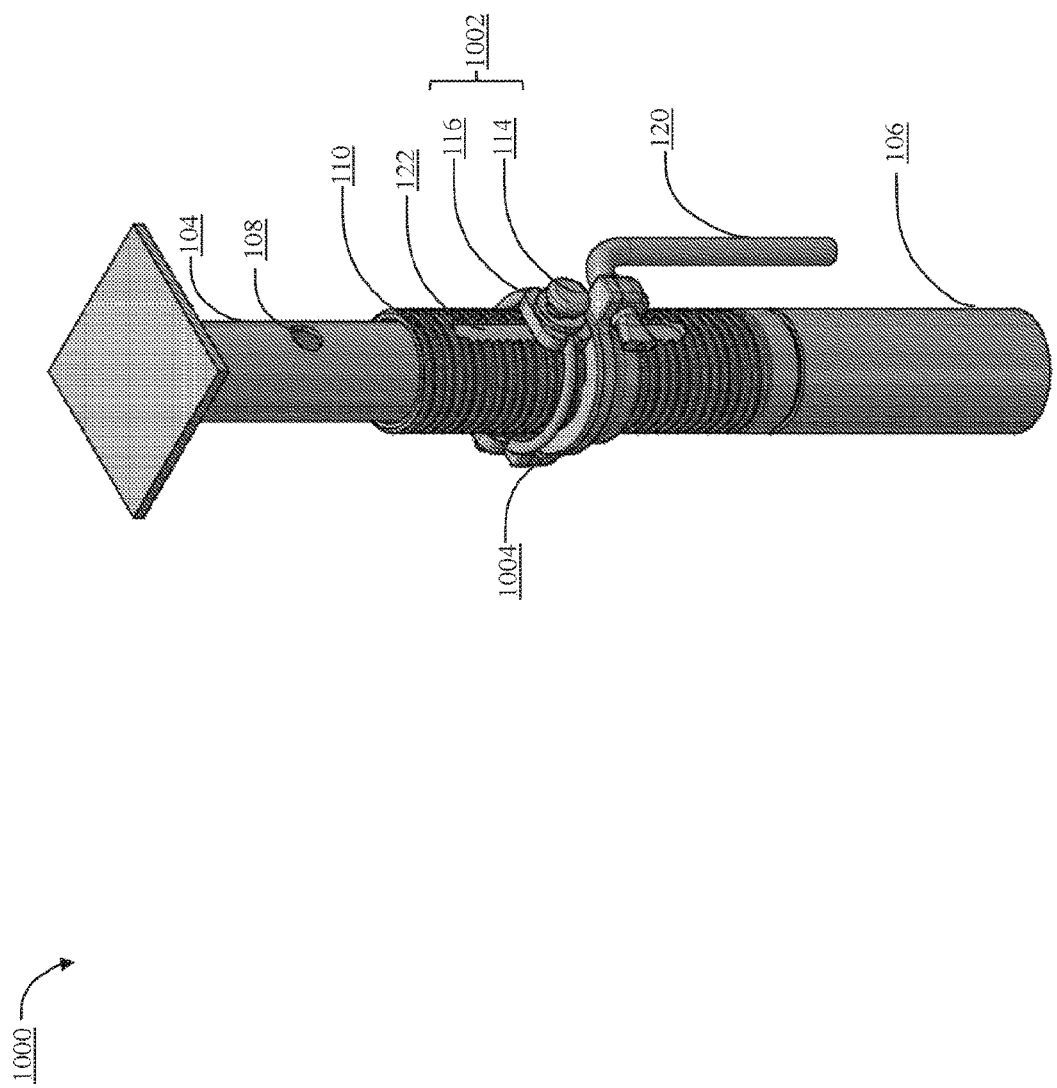
FIG. 10 illustrates an isometric view of an adjustable telescopic floor prop assembly having a locking mechanism, according to an embodiment of the present disclosure.
Figure 11:
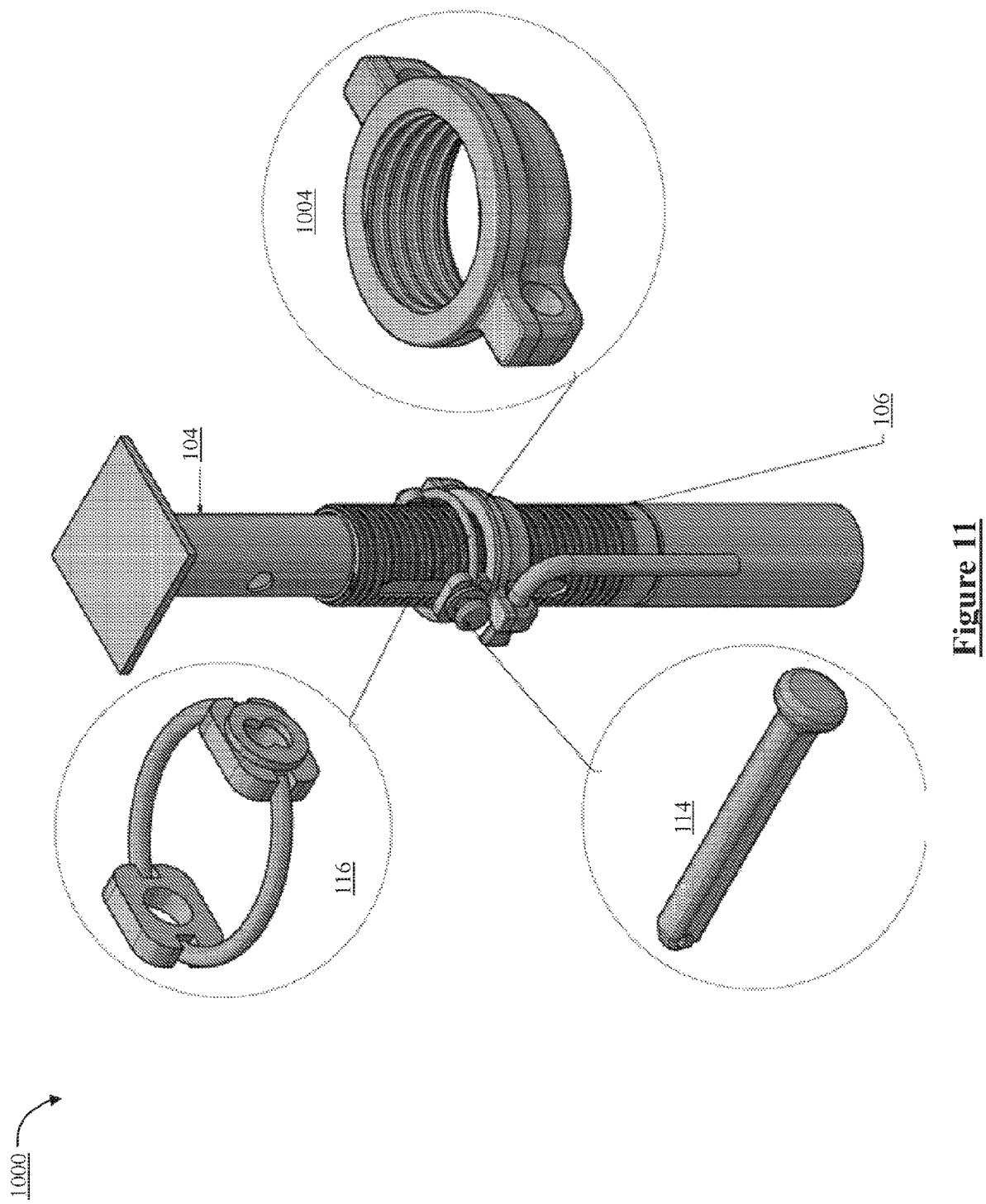
FIG. 11 illustrates an isometric view of the adjustable telescopic floor prop assembly depicting various components of the locking mechanism in a blown-up view, according to an embodiment of the present disclosure.

FIG. 10 illustrates an isometric view of an adjustable telescopic floor prop assembly 1000 having a locking mechanism 1002, according to an embodiment of the present disclosure. For the sake of readability, the adjustable telescopic floor prop assembly 1000 is hereinafter referred to as the floor prop assembly 1000. FIG. 11 illustrates an isometric view of the floor prop assembly 1000 depicting various components of the locking mechanism 1002 in a blown-up view, according to an embodiment of the present disclosure.

As illustrated in FIG. 10 and FIG. 11, the floor prop assembly 1000 includes the inner tube 104, the outer tube 106 placed concentrically with respect to the inner tube 104 such that the inner tube 104 is adapted to be extended out of the outer tube 106 for adjusting the length of the prop assembly 100, based on dimensions of a formwork structure to be supported. Further, the locking mechanism 1002 includes the prop nut 1004, the guiding ring 116 adapted to be disposed on the prop nut 1004, and the captive grooved pin assembly 114 adapted to be accommodated in the guiding ring 116 for locking and unlocking the inner tube 104 and the outer tube 106.

Figure 12A:
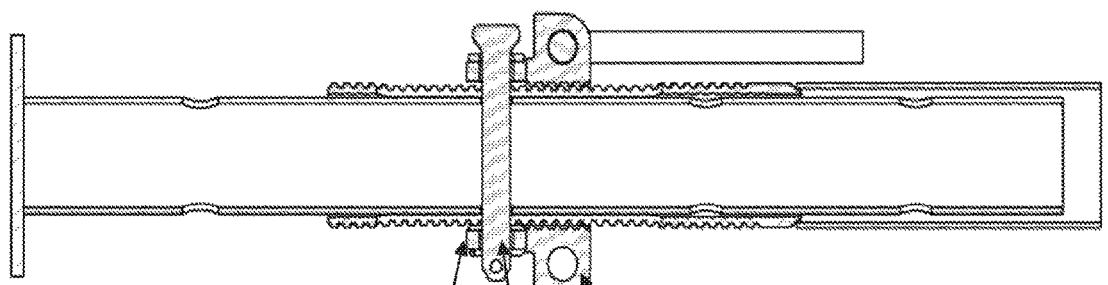
FIG. 12A illustrates a front schematic view of the adjustable telescopic floor prop assembly depicting the locking mechanism, according to an embodiment of the present disclosure.
Figure 12B:
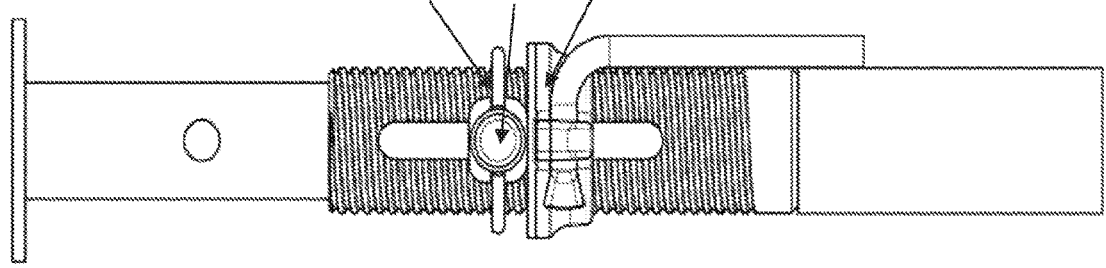
FIG. 12B illustrates a cross-sectional view of the adjustable telescopic floor prop assembly depicting the locking mechanism, according to an embodiment of the present disclosure.

FIG. 12A illustrates a front schematic view of the floor prop assembly 1000 depicting the locking mechanism 1002, according to an embodiment of the present disclosure. FIG. 12B illustrates a cross-sectional view of the floor prop assembly 1000 depicting the locking mechanism 1002, according to an embodiment of the present disclosure.

Figure 13:
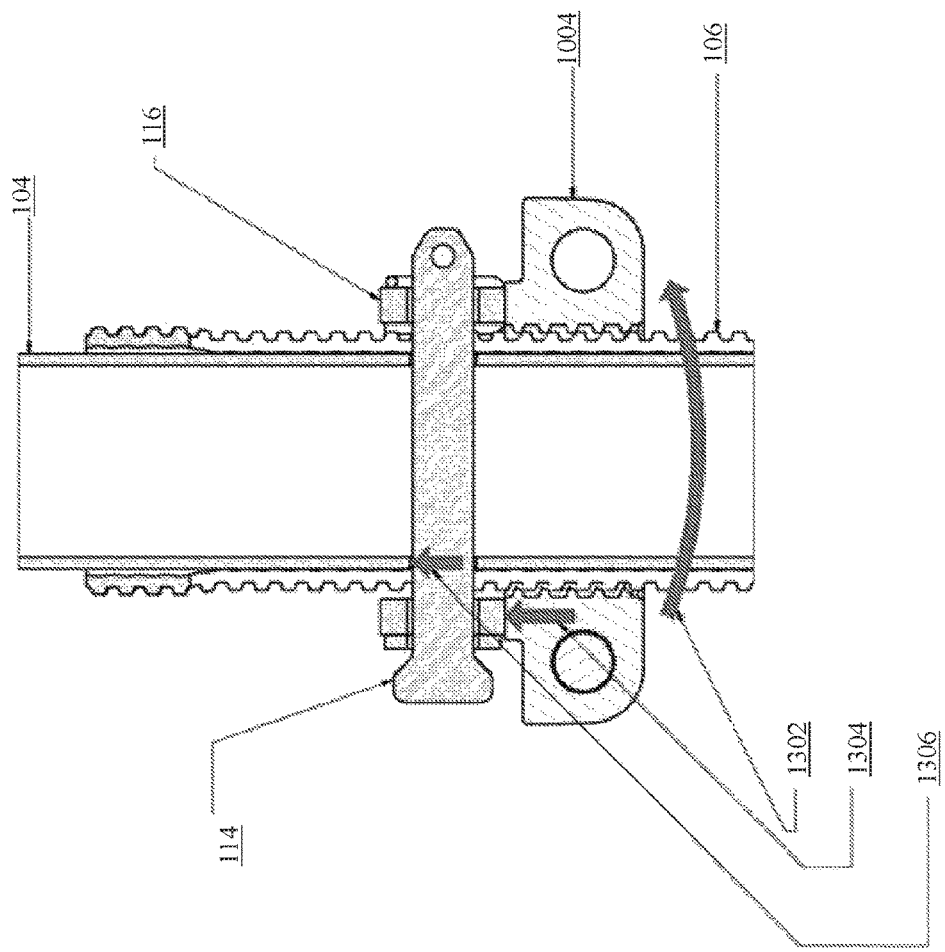
FIG. 13 illustrates a push action of the adjustable telescopic floor prop assembly, according to an embodiment of the present disclosure.
Figure 13:
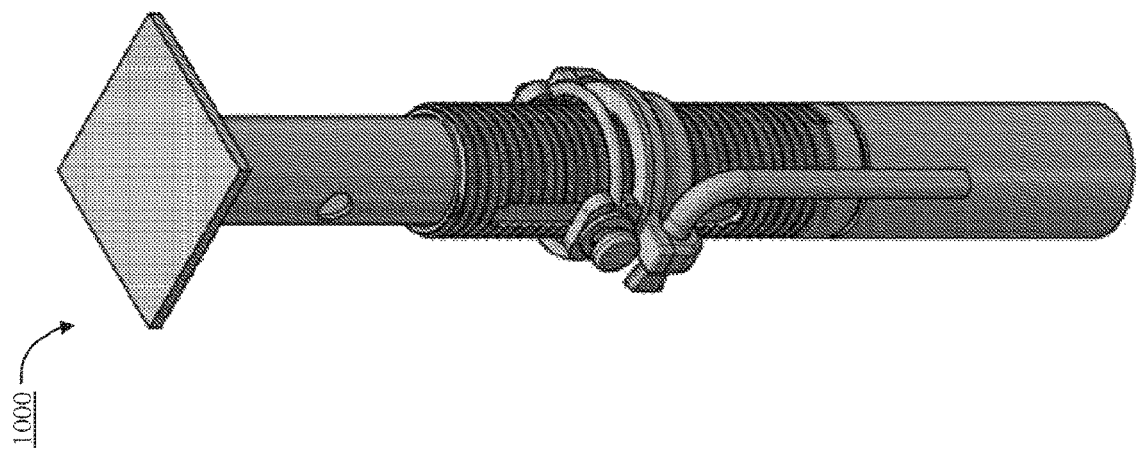

FIG. 13 illustrates a push action of the floor prop assembly 1000, according to an embodiment of the present disclosure. As illustrated through 1302, when rotated in an anti-clockwise direction, the prop nut 1004 moves upward along the threaded outer tube 106. Accordingly, as shown through 1304, the captive grooved pin assembly 114 and the guiding ring 116 positioned on the prop nut 1004 are pushed upwards along with the prop nut 1004. As a result, as illustrated through 1306, the inner tube 104 will move upward as the captive grooved pin assembly 114 is engaged in the slot 108 of the inner tube 104.

Figure 14A:
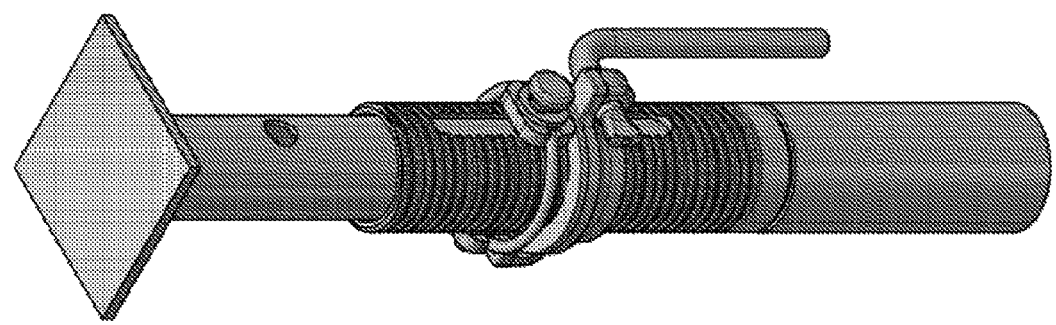
FIG. 14A and FIG. 14B illustrate a first isometric view and a second isometric view of the adjustable telescopic floor prop assembly depicting the locked position of the locking mechanism, respectively, according to an embodiment of the present disclosure.
Figure 14B:
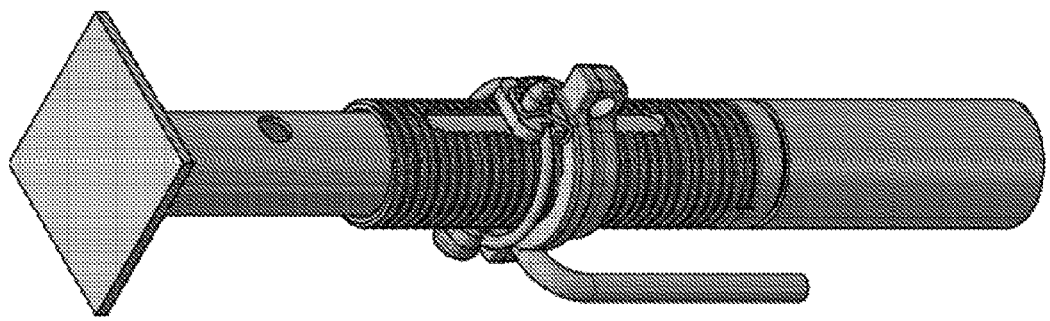
Figure 14C:
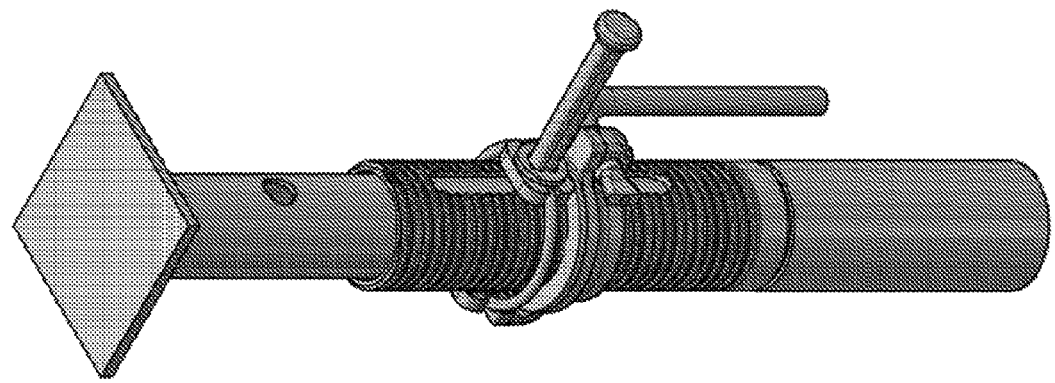
FIG. 14C illustrates an isometric view of the adjustable telescopic floor prop assembly depicting the unlocked position of the locking mechanism, according to an embodiment of the present disclosure.
Figure 15D:
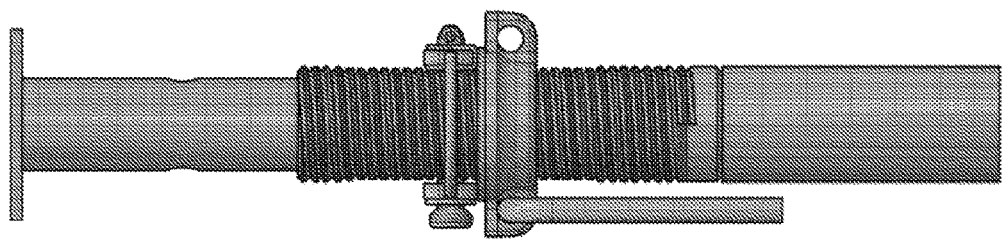
FIG. 15A, FIG. 15B, FIG. 15C, FIG. 15D, FIG. 15E, and FIG. 15F illustrate a front view, a back view, a left view, a right view, a top view, and a bottom view, respectively, of the adjustable telescopic floor prop assembly, according to an embodiment of the present disclosure.
Figure 15C:
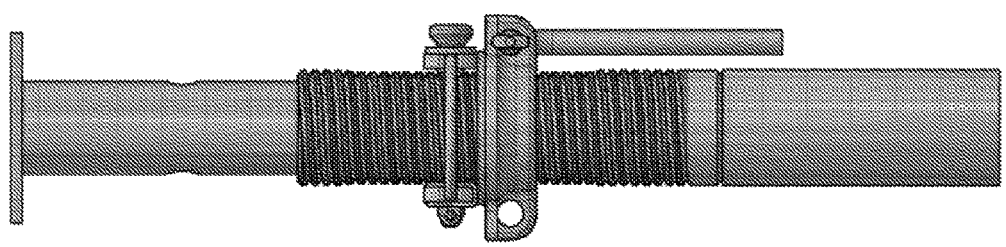
Figure 15B:
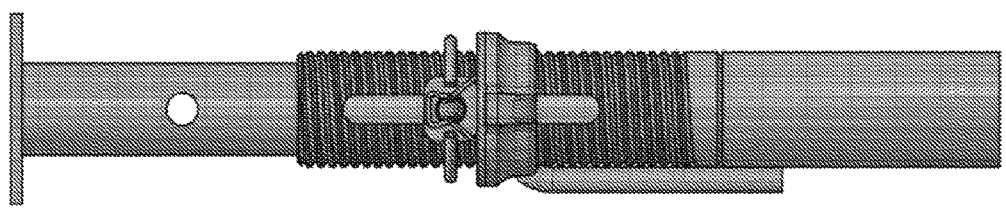
Figure 15A:
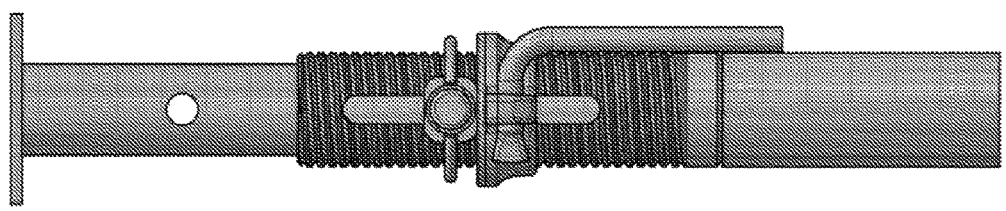
Figure 15F:
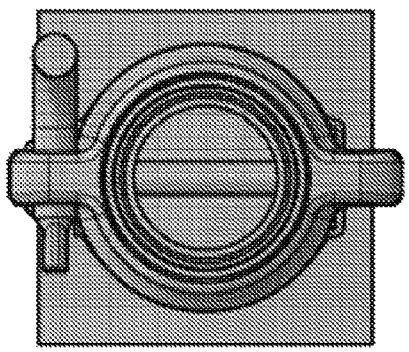
Figure 15E:
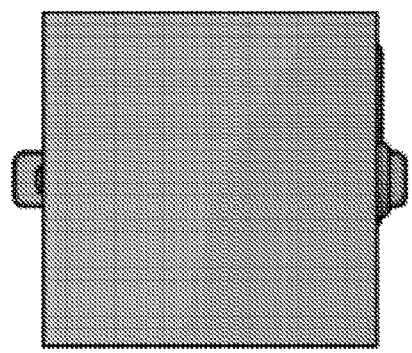

FIG. 14A and FIG. 14B illustrate a first isometric view and a second isometric view of the floor prop assembly 1000 depicting the locked position of the locking mechanism 1002, respectively, according to an embodiment of the present disclosure. FIG. 14C illustrates an isometric view of the floor prop assembly 1000 depicting the unlocked position of the locking mechanism 1002, according to an embodiment of the present disclosure.

FIG. 15A, FIG. 15B, FIG. 15C, FIG. 15D, FIG. 15E, and FIG. 15F illustrate a front view, a back view, a left view, a right view, a top view, and a bottom view, respectively, of the floor prop assembly 1000, according to an embodiment of the present disclosure.

As would be gathered, the locking mechanisms 102, 1002 offer a comprehensive approach for locking of the inner tube 104 and the outer tube 106 of the respective prop assemblies 100, 1000. Further, the slotted prop nut 112 of the locking mechanism 102 has the slot 302 to accommodate the guiding ring 116. Therefore, an overall space for assembling the locking mechanism 102 is significantly reduced. This would also eliminate the need of having a separate connecting mechanism for connecting the slotted prop nut and the guiding ring 116. Furthermore, the captive grooved pin assembly 114 is locked with the guiding ring 116. Therefore, the possibility of misplacement of the captive grooved pin assembly 114 is eliminated. Further, the captive grooved pin assembly 114 is small in size ensuring an overall compact construction of the locking mechanisms 102, 1002 which contributes to improved logistics.

Also, the rotation of the slotted prop nut 112 or the prop nut 1004 is not affected by the positioning of the captive grooved pin assembly 114 and the guiding ring 116. This is due to dimension of the pin and slot size of the nut which are kept in such a way that the rotation of the nut is not hindered.

This means the captive grooved pin assembly 114 and guiding ring 116 can freely move upwards or downwards together with the slotted nut 102 creating the push-pull action though the ring and pin are interlocked in the nut. In addition, the spring-loaded mechanism 410 prevents accidental dislodging of the captive grooved pin assembly 114 in the locked position as well as to keep the captive grooved pin assembly 114 in position during rotation of the slotted prop nut 112 or the prop nut 1004. Therefore, the locking mechanisms 102, 1002 of the present disclosure is operation effective, lightweight, cost-effective, and convenient in operation.

Also, as would be appreciated by a person skilled in the art, while the locking mechanisms 102, 1002 are explained with respect to the prop assemblies 100, 1000, the locking mechanisms 102, 1002 can be used for any structure requiring similar locking of engaging and telescopic components. Therefore, the scope of the locking mechanisms 102, 1002 is not limited only to the prop assemblies 100, 1000.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A locking mechanism for locking an inner tube with an outer tube of an adjustable telescopic push-pull prop assembly, the locking mechanism comprising:

a slotted prop nut having a slot and adapted to move in either direction when rotated on the outer tube having threads;
a guiding ring adapted to be accommodated in the slot of the slotted prop nut; and
a captive grooved pin assembly adapted to be accommodated in the guiding ring for locking and unlocking the inner tube and the outer tube, such that the slotted prop nut encases the guiding ring and the captive grooved pin assembly, and positioning of the captive grooved pin assembly is such that it does not hinder the rotation of the slotted prop nut.

2. The locking mechanism as claimed in claim 1, wherein the slotted prop nut comprises:
a top portion having a first opening;
a bottom portion having a second opening adapted to be aligned with the first opening of the top portion, wherein the second opening comprises a plurality of threads; and
a pair of arms formed to connect the top portion to the bottom portion forming the slot to accommodate the guiding ring.

3. The locking mechanism as claimed in claim 1, wherein the captive grooved pin assembly comprises:
a shaft portion having a pair of oppositely positioned grooves formed along a length of the shaft portion such that a profile of a first end of the shaft portion is different from a profile of a second end of the shaft portion; and
a head portion adapted to be used to pull out the shaft portion.

4. The locking mechanism as claimed in claim 3, wherein the guiding ring comprises:
a first slot having a profile corresponding to the profile of the second end of the shaft portion of the captive grooved pin assembly; and
a second slot formed at a diametrically opposite point with respect to the first slot and having a profile corresponding to the profile of the first end of the shaft portion of the captive grooved pin assembly.

5. The locking mechanism as claimed in claim 3, wherein the captive grooved pin assembly comprises at least one of a rivet, a spot weld, and a dowel pin formed on the shaft portion and adapted to keep the grooved pin assembly captive in the guiding ring in a locked state.

6. The locking mechanism as claimed in claim 4, further comprising a spring-loaded mechanism adapted to prevent accidental dislodging of the captive grooved pin assembly out of the first slot, wherein the spring-loaded mechanism comprises one of:
a spring ball stopper formed on the shaft portion of the captive grooved pin assembly; and
an omega clip disposed on the guiding ring.

7. An adjustable telescopic push-pull prop assembly for supporting a formwork structure, the prop assembly comprising:
an inner tube;
an outer tube placed concentrically with respect to the inner tube such that the inner tube is adapted to be extended out of the outer tube for adjusting a length of the prop assembly, based on dimensions of a formwork structure to be supported; and
a locking mechanism for locking the inner tube with the outer tube, the locking mechanism comprising:
a slotted prop nut having a slot and adapted to move in either direction when rotated on the outer tube having threads;
a guiding ring adapted to be accommodated in the slot of the slotted prop nut; and
a captive grooved pin assembly adapted to be accommodated in the guiding ring for locking and unlocking the inner tube and the outer tube, such that the slotted prop nut encases the guiding ring and the captive grooved pin assembly, and positioning of the captive grooved pin assembly is such that it does not hinder the rotation of the slotted prop nut.

8. A locking mechanism for locking and unlocking an inner tube and an outer tube of an adjustable telescopic floor prop assembly, the locking mechanism comprising:
a guiding ring adapted to be disposed on a prop nut; and
a captive grooved pin assembly adapted to be accommodated in the guiding ring for locking and unlocking the inner tube and the outer tube, wherein the captive grooved pin assembly comprises: a shaft portion having a pair of oppositely positioned grooves formed along a length of the shaft portion such that a profile of a first end of the shaft portion is different from a profile of a second end of the shaft portion; and a head portion adapted to be used to pull out the shaft portion,
wherein the guiding ring comprises:
a first slot having a circular profile corresponding to the profile of the second end of the shaft portion of the captive grooved pin assembly; and
a second slot formed at a diametrically opposite point with respect to the first slot and having a profile corresponding to the pair of oppositely positioned grooves of the first end of the shaft portion of the captive grooved pin assembly.

9. The locking mechanism as claimed in claim 8, wherein the captive grooved pin assembly comprises at least one of a rivet, a spot weld, and a dowel pin formed on the shaft portion and adapted to keep the grooved pin assembly captive in the guiding ring in a locked state.

10. The locking mechanism as claimed in claim 8, further comprising a spring-loaded mechanism adapted to prevent accidental dislodging of the captive grooved pin assembly out of the first slot, wherein the spring-loaded mechanism comprises one of:
a spring ball stopper formed on the shaft portion of the captive grooved pin assembly; and
an omega clip disposed on the guiding ring.

* * * * *